(12) United States Patent
Harris et al.

(10) Patent No.: US 11,766,932 B2
(45) Date of Patent: Sep. 26, 2023

(54) OFF ROAD VEHICLE

(71) Applicant: Arctic Cat Inc., Thief River Falls, MN (US)

(72) Inventors: Brian Harris, Thief River Falls, MN (US); Todd MacDonald, Thief River Falls, MN (US); Cody Kallock, Oslo, MN (US); Robby Gordon, Charlotte, NC (US); Mike Niemiec, Charlotte, NC (US); Michael McKeen, Buffalo, MN (US)

(73) Assignee: ARCTIC CAT INC., Thief River Falls, MN (US)

( * ) Notice: Subject to any disclaimer, the term of this patent is extended or adjusted under 35 U.S.C. 154(b) by 0 days.

(21) Appl. No.: 17/670,681

(22) Filed: Feb. 14, 2022

(65) Prior Publication Data
US 2022/0169114 A1    Jun. 2, 2022

Related U.S. Application Data

(63) Continuation of application No. 16/714,076, filed on Dec. 13, 2019, now abandoned, which is a
(Continued)

(51) Int. Cl.
*B60K 17/34* (2006.01)
*B62D 21/11* (2006.01)
(Continued)

(52) U.S. Cl.
CPC ............ *B60K 17/34* (2013.01); *B60G 3/145* (2013.01); *B60G 3/185* (2013.01); *B60G 3/207* (2013.01);
(Continued)

(58) Field of Classification Search
CPC ......... B60K 5/04; B62D 21/11; B62D 63/025
See application file for complete search history.

(56) References Cited

U.S. PATENT DOCUMENTS

| 2,474,360 A | 6/1949 | Jimerson |
| 3,608,936 A | 9/1971 | Karden |
(Continued)

FOREIGN PATENT DOCUMENTS

| CN | 103057392 A | * | 4/2013 |
| CN | 113074192 A | | 7/2021 |
(Continued)

OTHER PUBLICATIONS

Brandel et al., Car with exchangeable rear engine—Has rear engine and wheels mounted in detachable subframe plugging into car shell and fixed by vertical bolts, Mar. 17, 1994, EPO, DE 4 230 529 A1, Machine Translation of Description (Year: 1994).*
(Continued)

*Primary Examiner* — James A English
(74) *Attorney, Agent, or Firm* — Billion & Armitage

(57) ABSTRACT

An off-road vehicle includes a frame, a front suspension, and a rear suspension. In some examples of the off-road vehicle, the rear suspension includes trailing arms with are pivotally attached to the frame rearward of an operator area. Further, the frame can include a front subframe assembly and a rear subframe assembly which are easily removable from the main frame of the vehicle to permit access to various components of the off-road vehicle.

17 Claims, 28 Drawing Sheets

Related U.S. Application Data continuation of application No. 15/244,793, filed on Aug. 23, 2016, now abandoned.

(60) Provisional application No. 62/208,805, filed on Aug. 23, 2015.

(51) Int. Cl.
| | |
|---|---|
| *B60K 5/12* | (2006.01) |
| *B60K 11/04* | (2006.01) |
| *B60K 17/16* | (2006.01) |
| *B62D 5/04* | (2006.01) |
| *B60G 7/00* | (2006.01) |
| *B60G 3/18* | (2006.01) |
| *B60G 3/20* | (2006.01) |
| *B60G 3/14* | (2006.01) |
| *B62D 23/00* | (2006.01) |
| *B60K 5/04* | (2006.01) |
| *B60K 5/10* | (2006.01) |
| *B60K 5/00* | (2006.01) |

(52) U.S. Cl.
CPC ............ *B60G 7/006* (2013.01); *B60K 5/1275* (2013.01); *B60K 11/04* (2013.01); *B60K 17/165* (2013.01); *B62D 5/04* (2013.01); *B62D 21/11* (2013.01); *B62D 23/005* (2013.01); *B60G 2200/1322* (2013.01); *B60G 2200/1442* (2013.01); *B60G 2200/18* (2013.01); *B60G 2200/46* (2013.01); *B60G 2200/4622* (2013.01); *B60G 2204/129* (2013.01); *B60G 2204/1242* (2013.01); *B60G 2204/15* (2013.01); *B60G 2204/61* (2013.01); *B60G 2204/62* (2013.01); *B60G 2300/07* (2013.01); *B60K 5/04* (2013.01); *B60K 5/10* (2013.01); *B60K 2005/003* (2013.01); *B60Y 2200/20* (2013.01); *B60Y 2400/72* (2013.01)

(56) References Cited

U.S. PATENT DOCUMENTS

| | | | |
|---|---|---|---|
| 4,103,514 | A | 8/1978 | Grosse-Entrup |
| 4,177,654 | A | 12/1979 | Aucktor |
| 4,223,758 | A | 9/1980 | Schopf |
| 4,254,639 | A | 3/1981 | Teramachi |
| 4,705,491 | A | 11/1987 | Andersson |
| 5,026,325 | A | 6/1991 | Welschof |
| 5,036,939 | A | 8/1991 | Johnson et al. |
| 5,611,733 | A | 3/1997 | Jacob et al. |
| 5,624,318 | A | 4/1997 | Jacob et al. |
| 5,725,453 | A | 3/1998 | Zalewski et al. |
| 5,836,599 | A | 11/1998 | Rein |
| 5,855,386 | A | 1/1999 | Atkins |
| 6,112,843 | A | 9/2000 | Wilcox et al. |
| 6,145,416 | A | 11/2000 | Bonniot |
| 6,217,456 | B1 | 4/2001 | Jacob |
| 6,234,908 | B1 | 5/2001 | Jacob |
| 6,254,487 | B1 | 7/2001 | Jacob |
| 6,306,045 | B1 | 10/2001 | Jacob |
| 6,390,928 | B1 | 5/2002 | Welschof et al. |
| 6,422,369 | B1 | 7/2002 | McCalla |
| 6,585,602 | B2 | 7/2003 | Cermak et al. |
| 6,851,691 | B2 | 2/2005 | Rasidescu et al. |
| 6,874,392 | B1 | 4/2005 | Wu |
| 6,902,487 | B2 | 6/2005 | Welschof |
| 7,018,317 | B2 | 3/2006 | Tweet |
| 7,229,358 | B2 | 6/2007 | Carlini et al. |
| 7,281,984 | B2 | 10/2007 | Foster-Hamilton et al. |
| 7,363,999 | B2 | 4/2008 | Hastings |
| 7,488,257 | B1 | 2/2009 | Booker et al. |
| 7,510,199 | B2 | 3/2009 | Nash et al. |
| 7,670,229 | B2 | 3/2010 | Disser et al. |
| 7,673,719 | B2 | 3/2010 | Buschena |
| 7,762,894 | B2 | 7/2010 | Momiyama et al. |
| 7,905,540 | B2 | 3/2011 | Kiley et al. |
| 8,070,611 | B2 | 12/2011 | Wormsbaecher et al. |
| 8,083,245 | B2 | 12/2011 | Hatzikakidis |
| 8,118,683 | B2 | 2/2012 | Disser et al. |
| 8,328,649 | B2 | 12/2012 | Disser |
| 8,388,457 | B2 | 3/2013 | Keller |
| 8,523,209 | B2 | 9/2013 | Pollmeyer et al. |
| 8,573,337 | B1 | 11/2013 | Luoma et al. |
| 8,649,950 | B2 | 2/2014 | Yang |
| 8,746,394 | B2 | 6/2014 | Kuramoto et al. |
| 8,746,719 | B2 | 6/2014 | Safranski et al. |
| 8,764,039 | B2 | 7/2014 | Keller |
| 8,870,667 | B2 | 10/2014 | Buth et al. |
| 9,381,785 | B2 | 7/2016 | Gale |
| 9,493,185 | B2 | 11/2016 | Dada et al. |
| 9,623,909 | B1 | 4/2017 | Hirano |
| 9,623,912 | B2 | 4/2017 | Schlangen |
| 10,036,428 | B2 | 7/2018 | Doner et al. |
| 10,124,659 | B2 | 11/2018 | Bessho et al. |
| 10,160,497 | B2 | 12/2018 | Wimpfheimer et al. |
| 10,196,094 | B2 | 2/2019 | Tsumiyama et al. |
| 10,280,683 | B1 | 5/2019 | Smid |
| 10,350,952 | B2 | 7/2019 | Gordon et al. |
| 10,358,029 | B2 | 7/2019 | Gruschow et al. |
| 2002/0166603 | A1 | 11/2002 | Camacho |
| 2003/0090128 | A1 | 5/2003 | Seksaria et al. |
| 2006/0012145 | A1 | 1/2006 | Gardner |
| 2007/0024044 | A1 | 2/2007 | Ogawa |
| 2010/0326761 | A1 | 12/2010 | Melcher |
| 2011/0127135 | A1 | 6/2011 | Grogg et al. |
| 2012/0031688 | A1 | 2/2012 | Safranski |
| 2012/0031693 | A1 | 2/2012 | Deckard et al. |
| 2012/0055729 | A1 | 3/2012 | Bessho |
| 2012/0063842 | A1 | 3/2012 | Keller |
| 2012/0223500 | A1 | 9/2012 | Kinsman |
| 2013/0033070 | A1 | 2/2013 | Kinsman et al. |
| 2013/0197756 | A1 | 8/2013 | Ramirez Ruiz |
| 2013/0319785 | A1 | 12/2013 | Spindler |
| 2014/0103627 | A1 | 4/2014 | Deckard et al. |
| 2014/0124279 | A1 | 5/2014 | Schlangen et al. |
| 2014/0262584 | A1 | 9/2014 | Lovold et al. |
| 2014/0345964 | A1 | 11/2014 | Nakaoka et al. |
| 2015/0061275 | A1 | 3/2015 | Deckard |
| 2015/0094158 | A1 | 4/2015 | Mondragon et al. |
| 2015/0137481 | A1 | 5/2015 | Manternach et al. |
| 2015/0292371 | A1 | 10/2015 | Barnes |
| 2016/0176287 | A1 | 6/2016 | Ripley et al. |
| 2016/0257360 | A1 | 9/2016 | Mackenzie |
| 2017/0001549 | A1 | 1/2017 | Bessho |
| 2017/0050483 | A1 | 2/2017 | Gordon |
| 2017/0050517 | A1 | 2/2017 | Higuchi |
| 2017/0050673 | A1 | 2/2017 | Gordon |
| 2017/0122377 | A1 | 5/2017 | Fukuzawa et al. |
| 2017/0174027 | A1 | 6/2017 | Mailhot et al. |
| 2017/0248169 | A1 | 8/2017 | Gordon |
| 2017/0292570 | A1 | 10/2017 | Ketchel et al. |
| 2018/0058821 | A1 | 3/2018 | Kwiatkowski et al. |
| 2018/0326846 | A1 | 11/2018 | Soto Velasco |
| 2020/0248750 | A1 | 8/2020 | Gordon |

FOREIGN PATENT DOCUMENTS

| | | | | |
|---|---|---|---|---|
| DE | 4230529 | A1 * | 3/1994 | ............... B60K 5/10 |
| DE | 102006016843 | A1 | 10/2007 | |
| EP | 1081023 | A1 * | 3/2001 | ............ B60K 17/00 |
| WO | 9002634 | A1 | 3/1990 | |
| WO | 2014059258 | A1 | 4/2014 | |

OTHER PUBLICATIONS

Bertrand Blanquet, Front structure of a motor car and motor car equipped with this structure, Mar. 7, 2001, EPO, EP 1 081 023 A1, Machine Translation of Description (Year: 2001).*

Fu et al., An engine suspension assembly, Apr. 24, 2013, PE2E database, CN 103057392 A, Machine Translation of Description (Year: 2013).*

(56) References Cited

OTHER PUBLICATIONS

"RCV Ultimate UTV Axle for Polaris IP900 Front ('11-'14)", Aug. 20, 2015, 1-2.

"U.S. Appl. No. 14/498,216 PTO File History".

Gordon, et al., "Universal Wishbone Trailing Arm—Specification", Aug. 21, 2015, USPTO, U.S. Appl. No. 62/208,531, filed 2015.

Gordon, et al., "Universal Wishbone Trailing Arm—Drawings", Aug. 21, 2015, USPTO, U.S. Appl. No. 62/208,531.

Dakar 2013: preparation of participants Robby Gordon, Nasser Al-Attiyah and Gerard De Rooy. Article showing Dakar Hummer; Oct. 19, 2012.

Image Off-Road Vehicle, http:www.race-dezert.com/forum/threads/extreme-baja-karts.37384; Dec. 23, 2007.

"1400HP Buckshot Racing sand car build Member Rides & Builds Show off your whip, Show off your System! SMD Forum", retrieved May 4, 2016 from http://www.stevemeadedesigns.com/board/topic/1375431400hpbuckshotracingsandcarbuild/.

"Monster Energy Buckshot Racing Sandrail at The Orange County Sand Show", YouTube Video, https://www.youtube.com/watch?v=UfroFVLVw; Published Sep. 15, 2012.

"RG Pro—Arctic Cat brochure".

"Universal Joint and Driveshaft Design Manual, AE-7, Society of Automotive Engineers", Inc., Warrendale, PA, pp. 311-319, TJ1079. S62. (Year: 1979), 311-319.

Speed RMG Partners, LLC, Robby Gordon, and Todd Romano, Plaintiffs, v. *Arctic Cat Sales Inc., Arctic Cat Inc., Textron Specialized Vehicles Inc., and Textron Inc*., Defendants. File No. 20-cv-609, Jury Trial Proceedings—vol. VIII, Dec. 14, 2022.

"Deposition of Michael J. McKeen, Feb. 16, 2021", *Speed RMG Partners* vs *Arctic Cat Sales Inc*., Case No. 0:20-cv-00609-SRN-LIB, United States District Court for the District of Minnesota.

"Checkmate: Speed UTV Live Presentation No. 108", Speed UTV, Retrieved Apr. 5, 2023 from https://www.youtube.com/watch?v=2tjmuXp9Tw4.

* cited by examiner

OFF ROAD VEHICLE

CROSS REFERENCE TO RELATED APPLICATIONS

This application is a continuation of U.S. application Ser. No. 16/714,076, filed Dec. 13, 2019, which is a continuation of U.S. application Ser. No. 15/244,793, filed on Aug. 23, 2016, which claims the benefit of and priority to U.S. Provisional application titled "Off Road Vehicle," having inventor Robby Gordon, and application Ser. No. 62/208,805, filed Aug. 23, 2015, which is herein incorporated by reference.

TECHNICAL FIELD

This document pertains generally, but not by way of limitation, to off road vehicles and their components.

BACKGROUND

Various types of off road vehicles are known in the art. There remains a need for vehicles having improved suspensions, frames, components, and modular construction.

DETAILED DESCRIPTION

Figure 1:
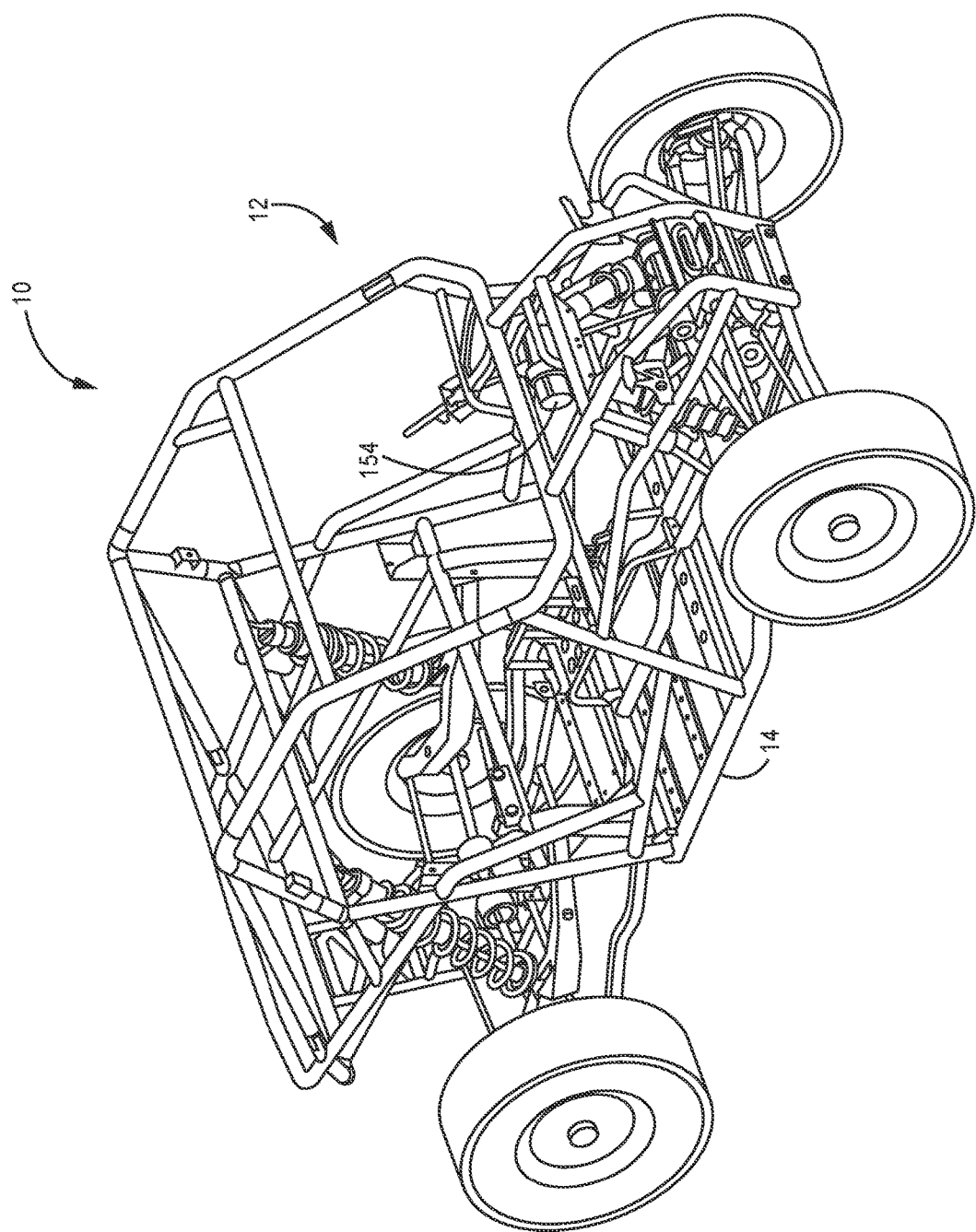
FIG. 1 is a perspective view of an off-road vehicle.

U.S. Pat. No. 8,764,039, titled "Suspension for Vehicle," filed Apr. 24, 2012, having inventors Keller and Seal is hereby incorporated by reference in its entirety. Further, the contents of U.S. Provisional application titled "Camber Adjusting Assembly," having inventor Robby Gordon, and application Ser. No. 62/208,537, filed Aug. 21, 2015, is herein incorporated by reference. Additionally, the contents of U.S. Provisional application titled "Universal Wishbone Trailing Arm," having inventor Robby Gordon, and application Ser. No. 62/208,531, filed Aug. 21, 2015, is also incorporated by reference herein. Additionally, the contents of U.S. application Ser. No. 15/242,320, titled "Universal Wishbone Trailing Arm," and U.S. application Ser. No. 15/242,864, titled "Camber Adjusting Assembly," both having first named inventor Robby Gordon are incorporated by reference herein. Finally, U.S. Provisional application titled "Off Road Vehicle," having inventor Robby Gordon, and application Ser. No. 62/208,805, filed Aug. 23, 2015, is herein incorporated by reference. Further, the immediate application claims the benefit of and priority to application Ser. No. 62/208,805, titled "Off Road Vehicle," having inventor Robby Gordon, and filed Aug. 23, 2015.

A vehicle includes a frame, a front suspension, and a rear suspension. In some examples, the vehicle is an off-road vehicle. The front and rear suspensions are attached to the frame. The vehicle further comprises an engine and drivetrain. In some examples, the drivetrain includes a CVT (continuously variable transmission). Further, in some examples, the vehicle is 4-wheel drive. In some examples, however, the vehicle is 2-wheel drive, for example having rear ground engaging members that are driven and front ground engaging members that are not driven by a prime mover (e.g., engine).

In some examples, the vehicle has one or more removable frame portions, for example a lower front frame portion. In some examples, a rear frame portion is removable. In some examples, removable frame portions are subframes. The removable frame portions can be configured to permit a user or mechanic to replace or work on a component or a set of components of the vehicle without having to incur significant time or effort to access the component or components.

In some examples, the vehicle suspension comprises a rear trailing arm suspension and a front A-arm suspension. The front suspension can include a spring attached to a lower A-arm. The front suspension can further include a shock attached to the lower A-arm.

In some examples, the spring and shock attached to the lower A-arm and are configured in a coil-over configuration.

In some examples, the vehicle includes a front lower subframe or front cradle that is removably attached to the frame, for example by fasteners such as nuts and bolts. In turn, the
front lower subframe can be detached from the frame quickly. Further, in some examples, removal of the front cradle permits the front differential to be removed from the vehicle in conjunction with the front cradle. In some examples, the steering rack is also attached to the front cradle such that the steering rack can be removed with the front lower subframe.

In some examples, the vehicle includes a rear subframe that is removably attached to the frame, for example by fasteners such as bolts and nuts. In some examples, the nuts are nut plates. Additionally, bolts can be threaded into threaded portions of structure. In some embodiments, the rear subframe is removed to permit easy access to a rear bulkhead, which is positioned forwardly of the rear of the rear subframe.

In some examples, the rear subframe is attached to a rear portion of the frame. The rear portion of the frame is located under an engine cradle and the engine and CVT are attached to the cradle. In some examples, the cradle is attached to the frame and the rear subframe with fasteners (e.g., bolts) such that the rear drive (e.g., rear differential) and engine can be removed with the cradle.

In some examples, the rear subframe includes a bulkhead. In some examples, the bulkhead is located rearwardly of the engine and the engine is located rearwardly of the passenger compartment. In some examples of the vehicle, the rear drive (e.g., rear differential) and engine can be removed in a modular fashion with the cradle and a bulkhead; upon removal of the engine and rear drive assembly, the rear suspension remains largely intact and attached to the frame. In some embodiments, removal of the cradle, bulkhead, engine, transmission, and rear drive can be removed in a modular fashion.

Figure 2:
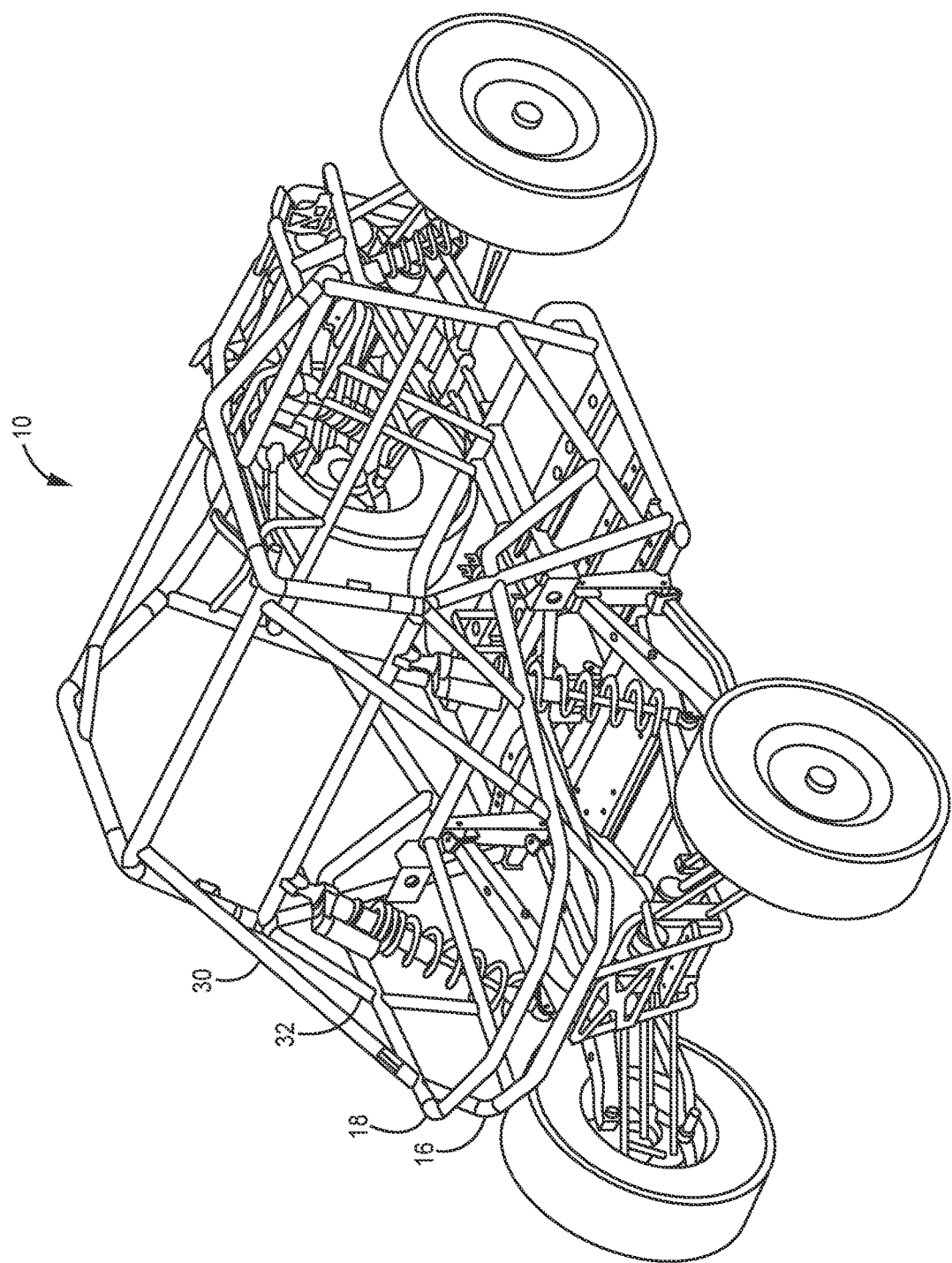
FIG. 2 is a perspective view of the off-road vehicle of FIG. 1.

With regard to FIGS. 1 and 2, a first example of a vehicle is shown. The vehicle includes a rear trailing arm suspension and a front A-arm suspension. As shown, the rear suspension includes upper and lower trailing arms and the upper trailing arm has a larger cross-sectional area than the lower trailing arm at a given position along the length of the vehicle. Additionally, the upper trailing arm has a spring and shock attached thereto. The spring and shock (e.g., a coil-over) are coupled to a frame member of the vehicle. In some examples, the coil-over is coupled to a frame member behind the passenger compartment. In some examples, the lower trailing arm is coupled to a frame member forwardly of a rear of a seatback. In some examples, the upper trailing arm is coupled to a frame member forwardly of a rear of a seatback. In some examples, however, one or both of the upper trailing arm and lower trailing arm is coupled to a frame member rearward of the rear of the seatback. Further, in some examples, one or both of the upper trailing arm and lower trailing arm is coupled to a respective frame member in the same lateral position (along the length of the vehicle) as the rear of the seatback.

As further illustrated in FIG. 1, the vehicle includes a roll-cage or roll-over protection system. The roll cage includes a plurality of roll cage disconnect locations. The roll cage disconnect locations permit removal of portions of the roll cage, for example to facilitate shipping of the vehicle.

As further shown in FIG. 2, the rear suspension includes an upper rear link and a lower rear link. The upper and lower rear links are attached to a wheel hub, for example a rear of the wheel hub. In some examples, the upper and lower rear links extend rearwardly from their attach points on the vehicle frame. In some examples, the upper and lower rear links are co-planar, such that the upper rear link is parallel to the lower rear link. Stated differently, in some examples, a plane passes through the upper and lower rear links.

With further regard to the front suspension, in some examples, the vehicle includes an upper A-arm, wherein the rear link of the upper A-arm is located forwardly of the shock and spring. The rear link of the upper A-arm can be perpendicular to the longitudinal axis of the vehicle.

Figure 3:
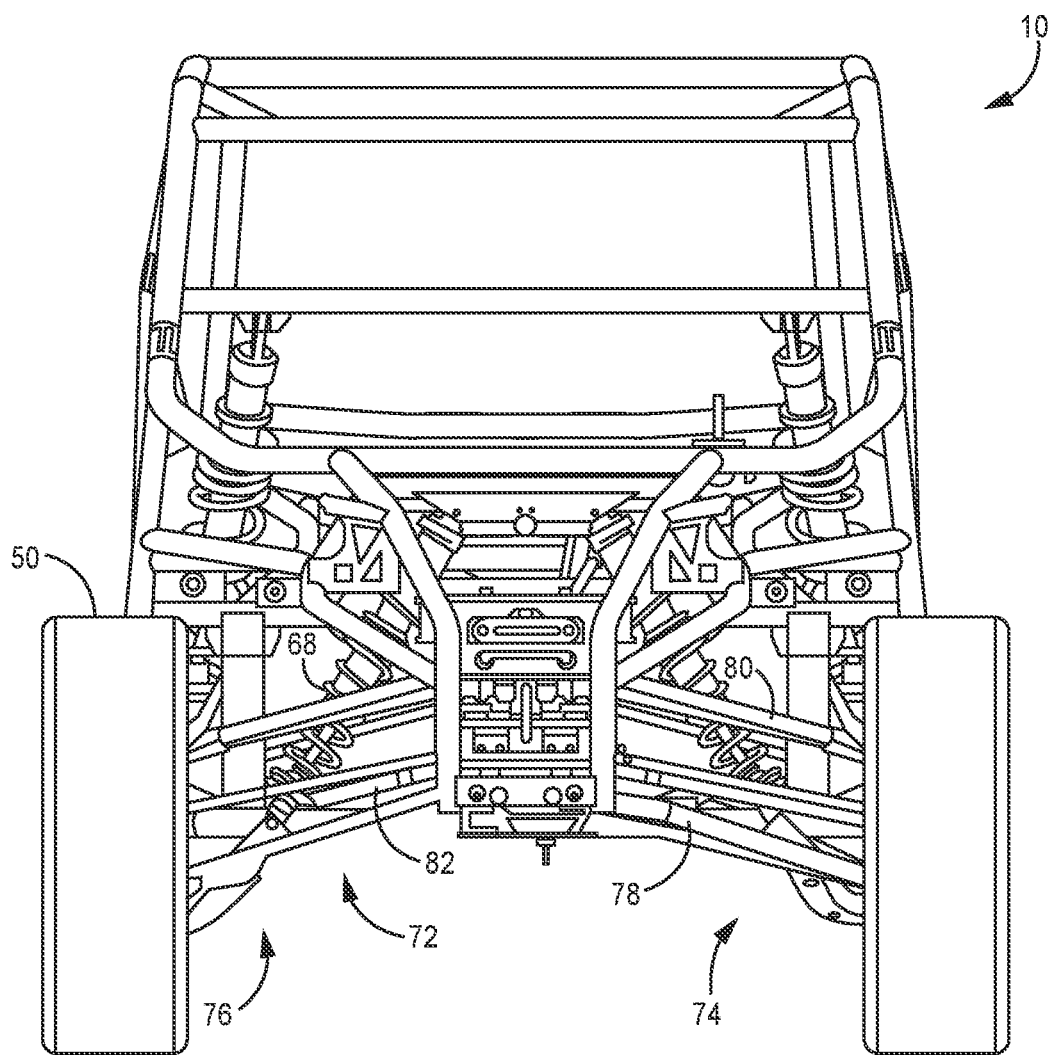
FIG. 3 is a front view of the off-road vehicle of FIG. 1.

Turning to FIG. 3, the front suspension has upper and lower A-arms and a spring and a shock, for example in a "coil-over" configuration. As shown, the coil-over is attached to a lower A-arm of the front suspension. In some examples, the lower A-arm has a bend in order to increase ground clearance at the outer portion of the A-arm. In some examples, however, one or both of the links of the lower A-arm is straight and does not include a bend. In some examples, both of the lower A-arm links lie in a plane such that neither of the links has a bend when viewed from the front of the vehicle, as shown in FIG. 3. In some examples, one of the links of the lower A-arm has a bend while the other of the links is straight, when viewed from the front of the vehicle.

Figure 5:
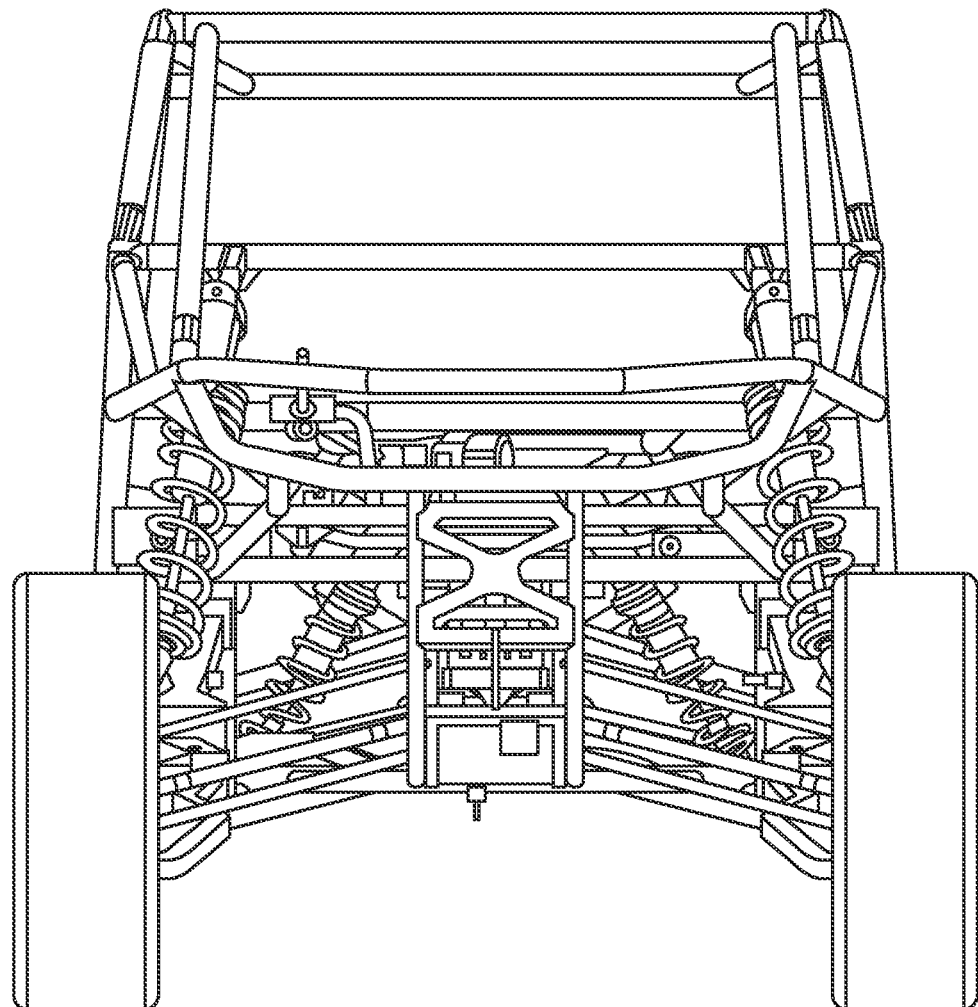
FIG. 5 is a rear view of the off-road vehicle of FIG. 1.

With regard to FIG. 5, the rear of an example of a vehicle is shown. As will be appreciated, the frame attachment location of the rear spring/shock is at least half the total height of the vehicle. In some examples, the frame attachment location of the rear spring/shock is at least 60%, 70% the total height of the vehicle.

Figure 6:
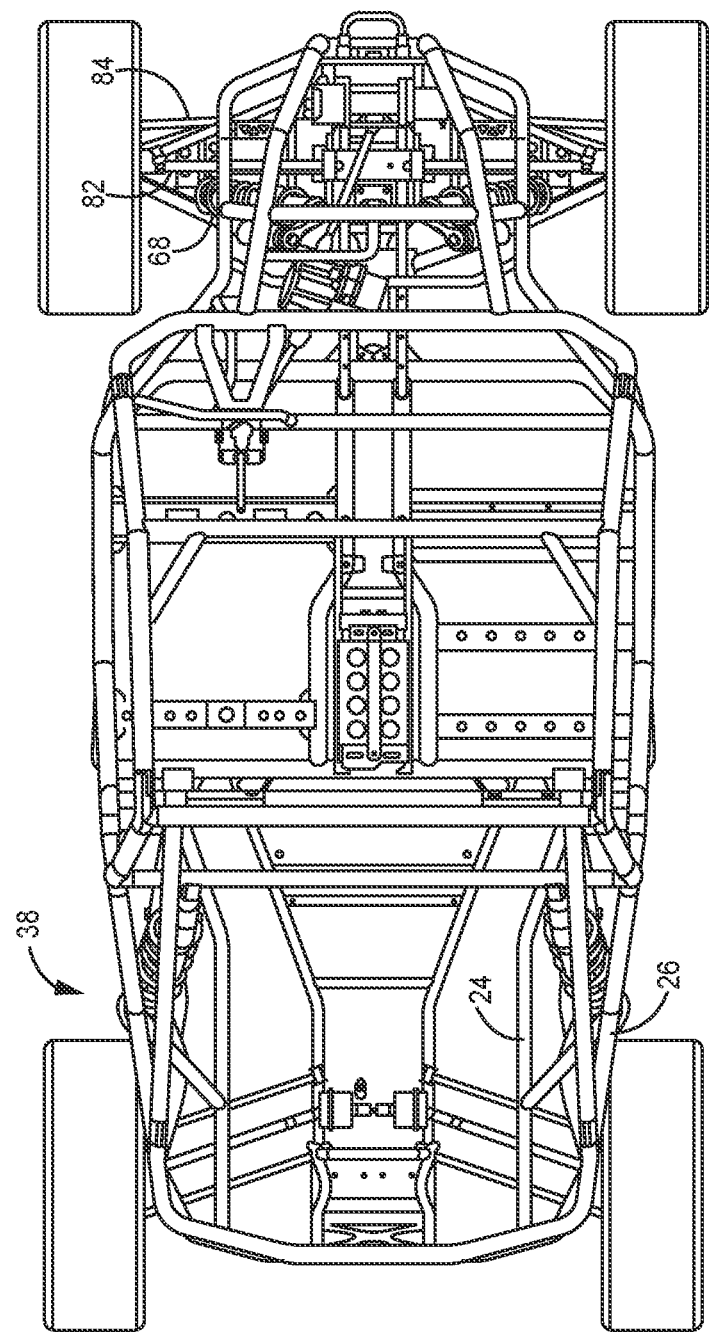
FIG. 6 is a top vie of the off-road vehicle of FIG. 1.
Figure 7:
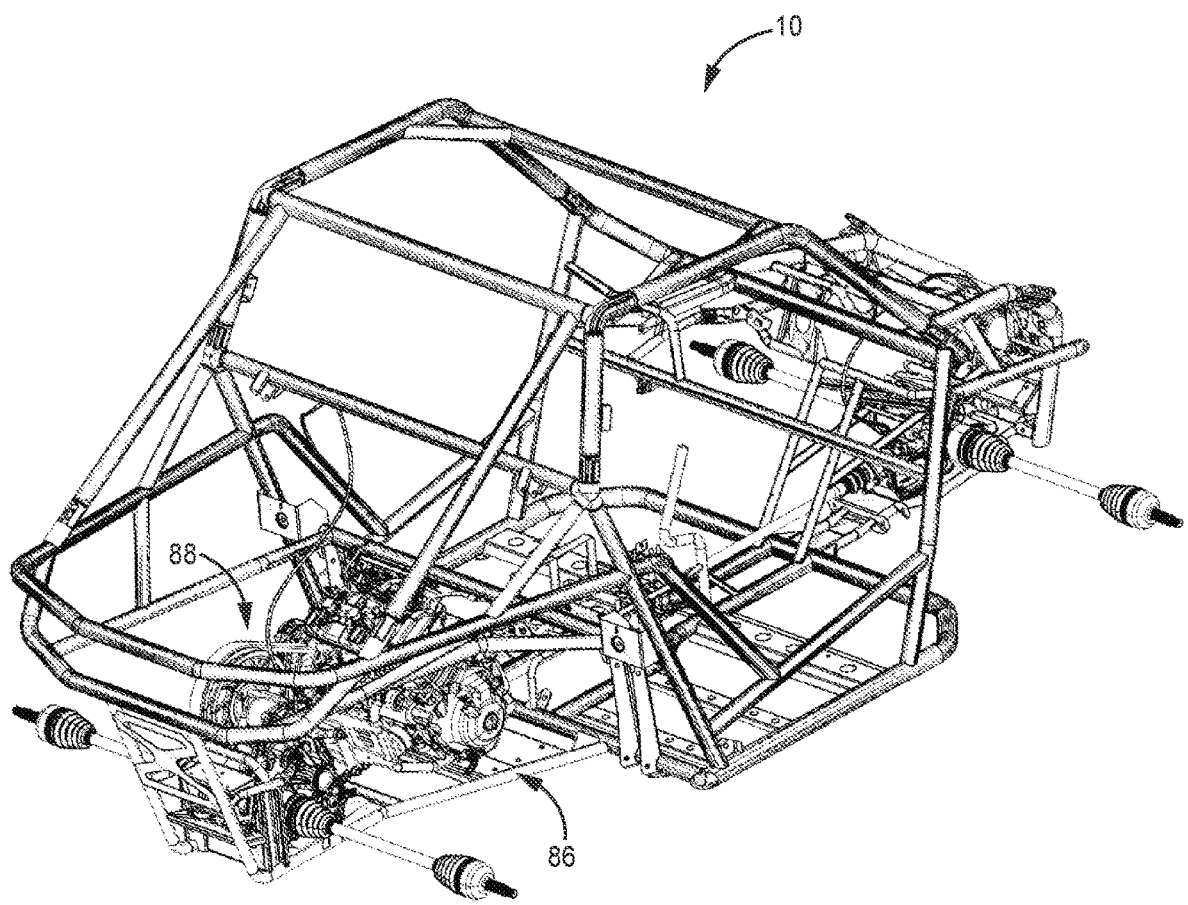
FIG. 7 is a perspective view of the off-road vehicle of FIG. 1.

With regard to FIG. 6, in some examples, the vehicle has a rear suspension having a front link disposed in front of the CV shaft. The front link can be attached to the wheel hub above or below the CV shaft. As shown in FIG. 7, however, the front link is attached to the hub below the CV shaft.

In some examples, a radiator is disposed rearwardly of the passenger compartment; in some examples, the radiator is in front of the passenger compartment, for example situated above the front differential. In some examples, coolant runs through a portion of the tubular members of the frame, for example where the engine is located rearwardly of the passenger compartment and the radiator is located forwardly of the engine compartment. Alternatively, in some examples, the vehicle has tubes or passages through which the coolant flows in a circuit between the engine and radiator.

An example of a rear suspension for a vehicle is further shown in FIGS. 14-17. As illustrated for example in FIG. 17, the spring and shock (e.g., coil-over) are coupled to the upper trailing arm along a line extending between the wheel center and the location at which the upper trailing arm attaches to the frame. In this way, torsional forces in the upper trailing are reduced when compared to a trailing arm having the spring pickup laterally offset from the line extending between the wheel center and the attachment location of the trailing arm.

Figure 19:
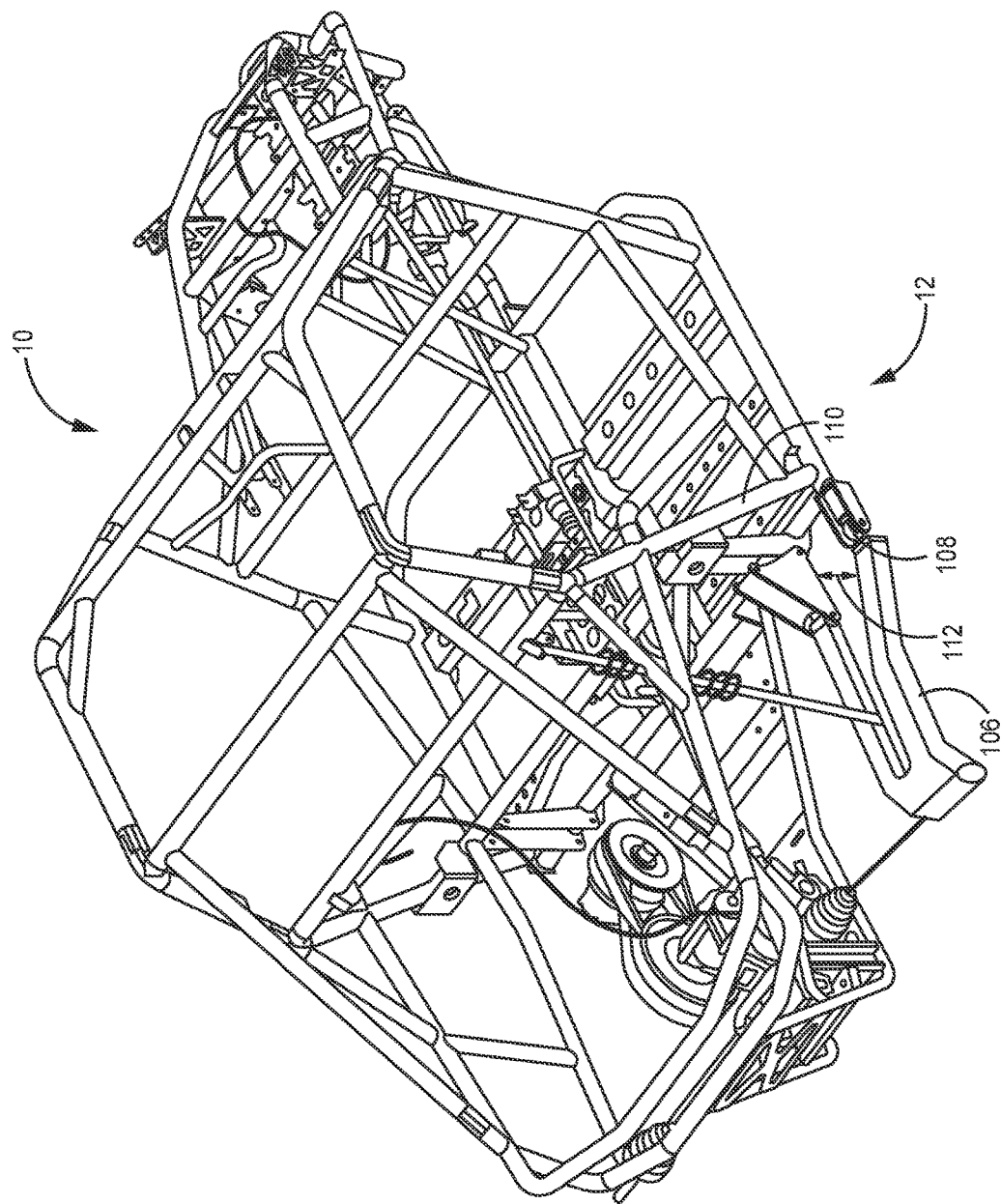
FIG. 19 is a perspective view of an off-road vehicle.

A second example of a rear suspension assembly is shown in FIG. 19. As illustrated, the rear suspension assembly of FIG. 19 includes a coil-over that is attached to a wishbone trailing arm between parallel portions of the wishbone. In some examples, the wishbone trailing arm is universal such that it can be attached to the left side of the vehicle or flipped over and attached to the right side of the vehicle. Moreover, in some examples, the wishbone trailing arm includes an anti-roll bar pickup for attachment to an anti-roll bar. The anti-roll bar pickup can be placed along the length of the wishbone trailing arm at any desirable location.

With regard to FIG. 19, the vehicle includes a driveshaft extending from the transmission (e.g., CVT) rearwardly of the passenger compartment to the front of the vehicle to drive the front ground engaging members (e.g., wheels). In some examples, the driveshaft has a driveline mount to rout the driveshaft through a center section of the vehicle between the right and left had sides (e.g., between a driver and passenger). The vehicle can include one or more driveline mounts which can be rigidly attached to the vehicle frame or, in some embodiments, can be mounted to the vehicle frame via damping members, such as rubberized inserts which can act to reduce the transmission of vibration from the driveline into the frame. In some examples, at least one driveline mounts is located along the centerline of the vehicle.

As further shown in FIG. 19, an example of a wishbone trailing arm is shown. The camber of the wishbone trailing arm can be adjusted by moving the adjuster, which can be any member that lengths or shortens, as desired. In some examples, the adjuster is a turnbuckle. In some examples, the adjuster can be a linear actuator or motor which is attached to a threaded barrel. In this way, the adjuster can be adjusted by the operator of the vehicle during operation of the vehicle. For example, the operator can adjust the wishbone suspension (e.g., camber) dynamically while the vehicle is in motion by flipping a switch in the passenger compartment. The adjuster can be moved in a first direction with a toggle switch attached to the linear actuator or a DC motor, this causing the adjuster to move in the first direction. To move the adjuster in the reverse direction, the operator can flip the toggle switch in an opposite direction to move the adjuster in an opposite direction. Such an adjuster may be particularly useful in a race application where the driver desires to adjust the performance characteristics of the vehicle without having to stop in a pit-stop, for example, and manually adjust the adjuster.

Figure 28:
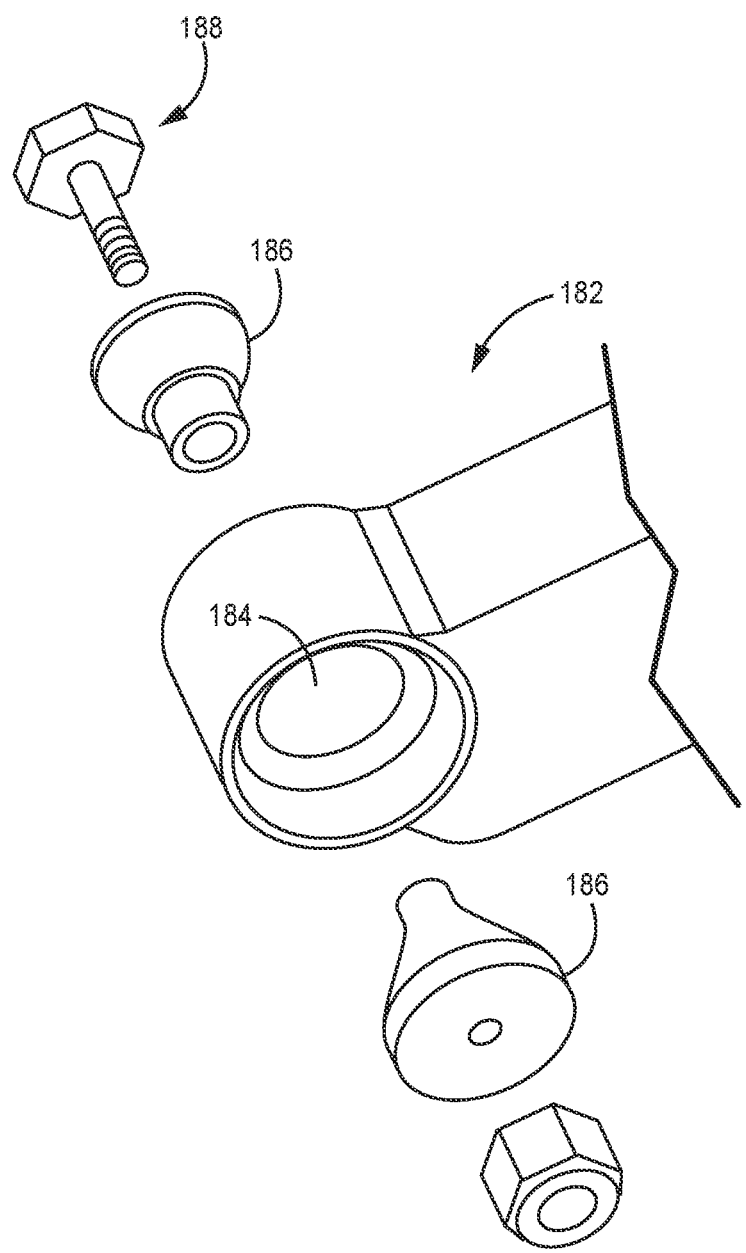
FIG. 28 is a detailed exploded view of a portion of a rear suspension assembly.

In some examples, the wishbone trailing arm includes two arms which meet at their distal end to form the wishbone. Each of the arms has an independent proximal end. In some examples, each of the proximal ends has a spherical bearing. An example of a spherical bearing being attached to an inboard arm of the wishbone trailing arm is shown in FIG. 28. One of the spherical bearings, for example of the inboard arm of the wishbone trailing arm is coupled to the adjuster, for example with a bolt. In some examples, the outboard arm of the wishbone suspension is coupled to the frame via a spherical bearing. In some examples, one or both of the spherical bearings are heim joints.

Figure 8:
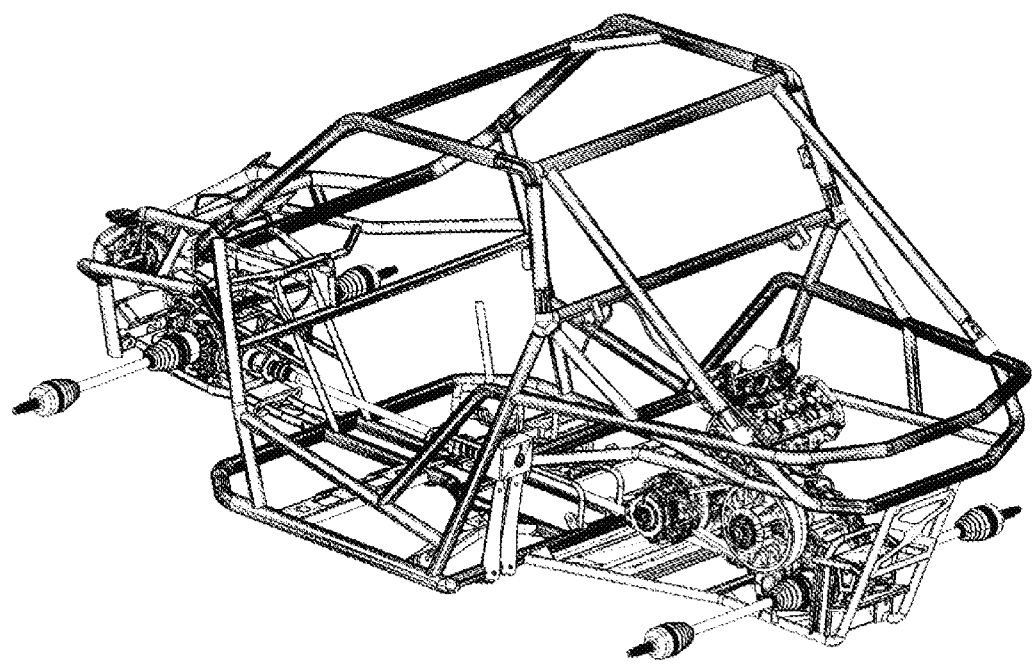
FIG. 8 is a perspective view of the off-road vehicle of FIG. 1

FIGS. 7 and 8 show an example of a vehicle having a prime mover (e.g., engine) mounted behind the passenger compartment. The prime mover can be of any suitable configuration, for example it can be an inline 3 cylinder gasoline engine. In some examples, the engine has a turbocharger with our without an intercooler. The intercooler can be an air-to-air intercooler or it can be a water-to-air intercooler. Additionally, the engine can have a mechanically driven supercharger, for example a belt driven blower, roots blower, centrifugal supercharger, screw-type supercharger, or any other suitable supercharger or turbocharger.

Figure 9:
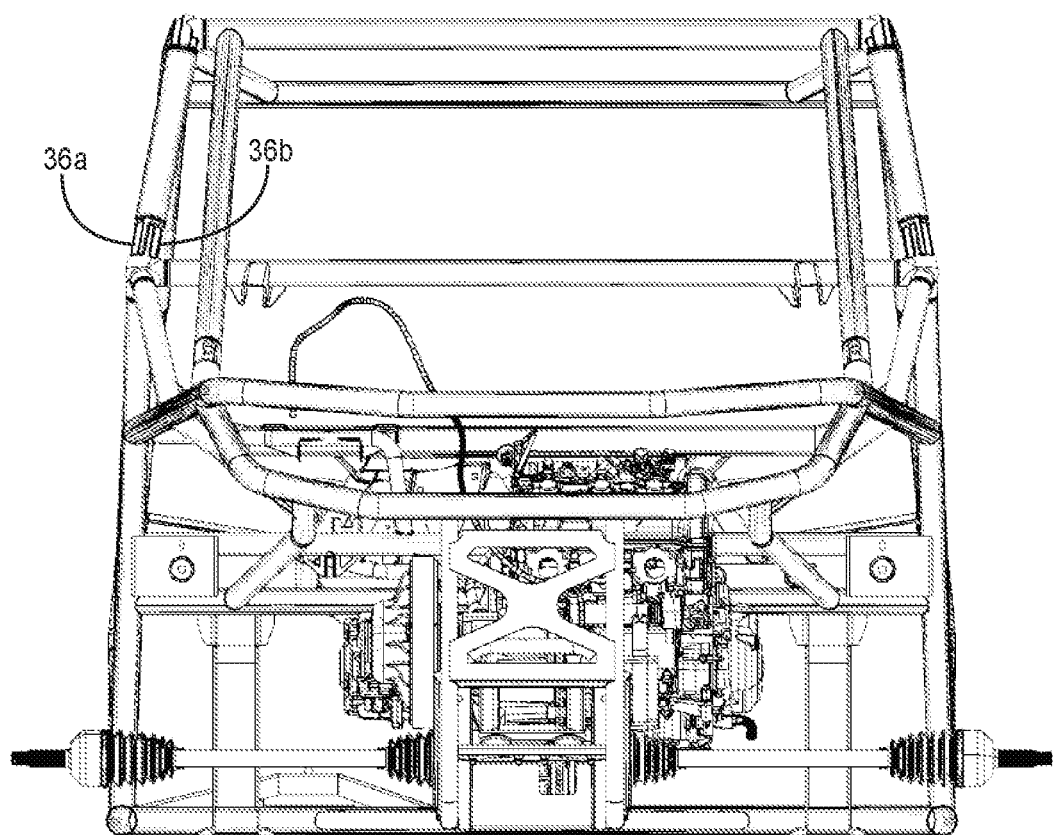
FIG. 9 is a rear view of the off-road vehicle of FIG. 1.
Figure 10:
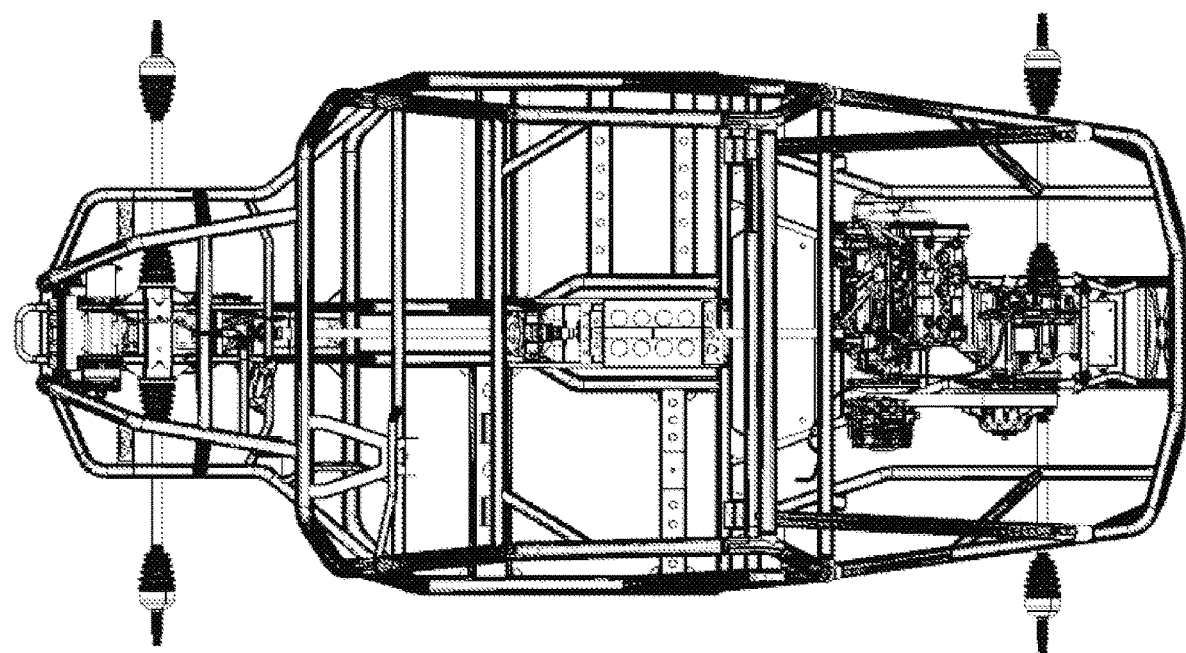
FIG. 10 is top view of the off-road vehicle of FIG. 1.
Figure 11:
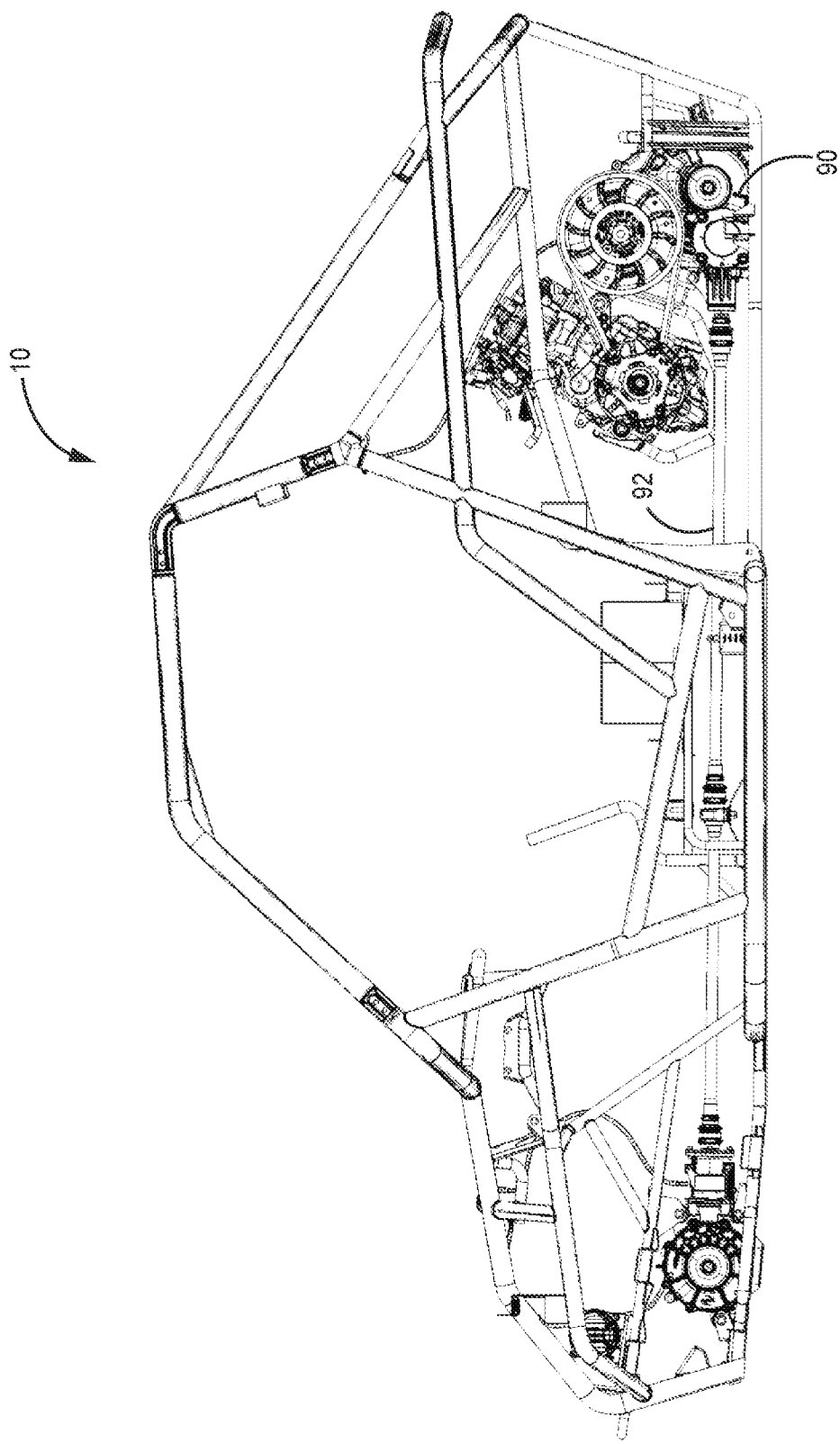
FIG. 11 is a side view of the off-road vehicle of FIG. 1.

FIGS. 9-11 show additional views of the vehicle.

Figure 13:
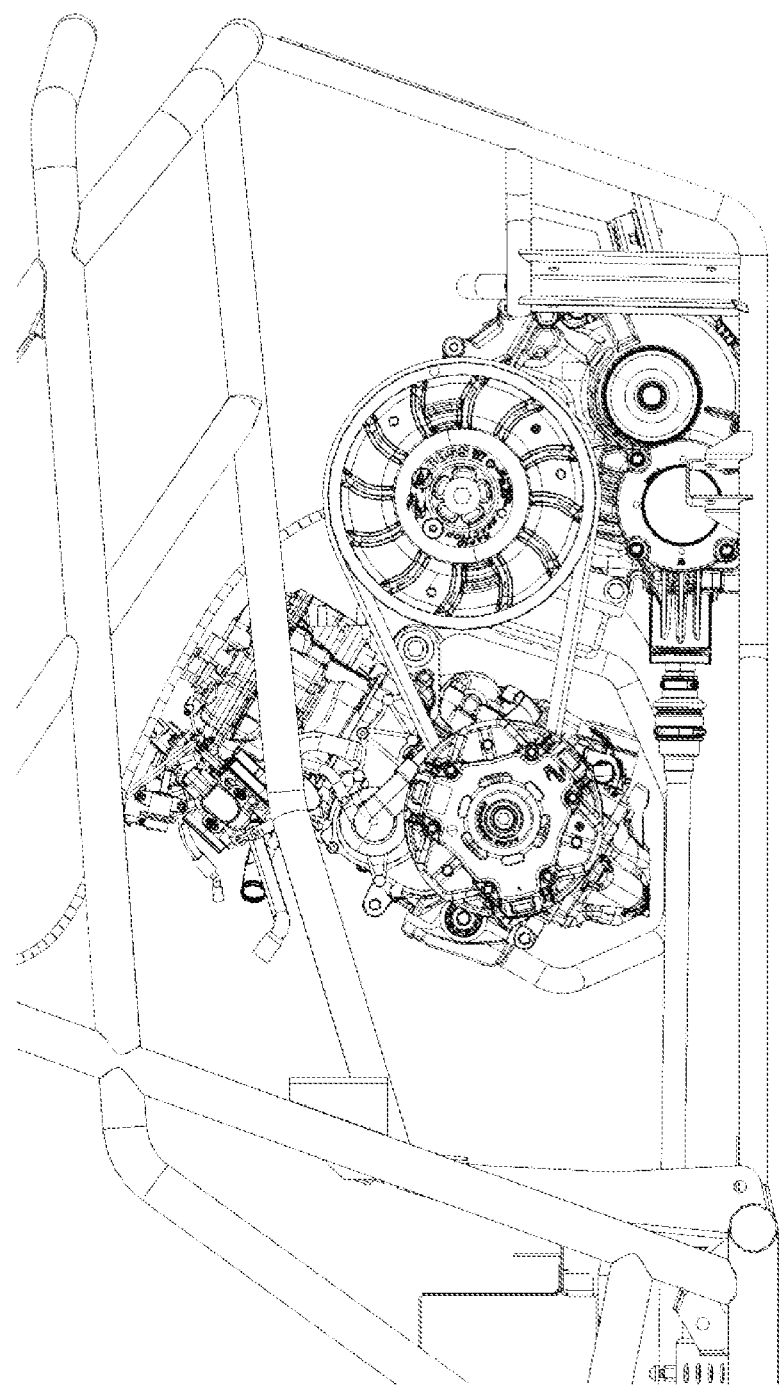
FIG. 13 is a detailed side view of a portion of the off-road vehicle of FIG. 11.

With regard to FIG. 13, a portion of a rear end of a vehicle is shown. In some examples, the vehicle includes an engine and transmission assembly with a cradle extending underneath the engine and attaching to both the engine and transmission.

Figure 21:
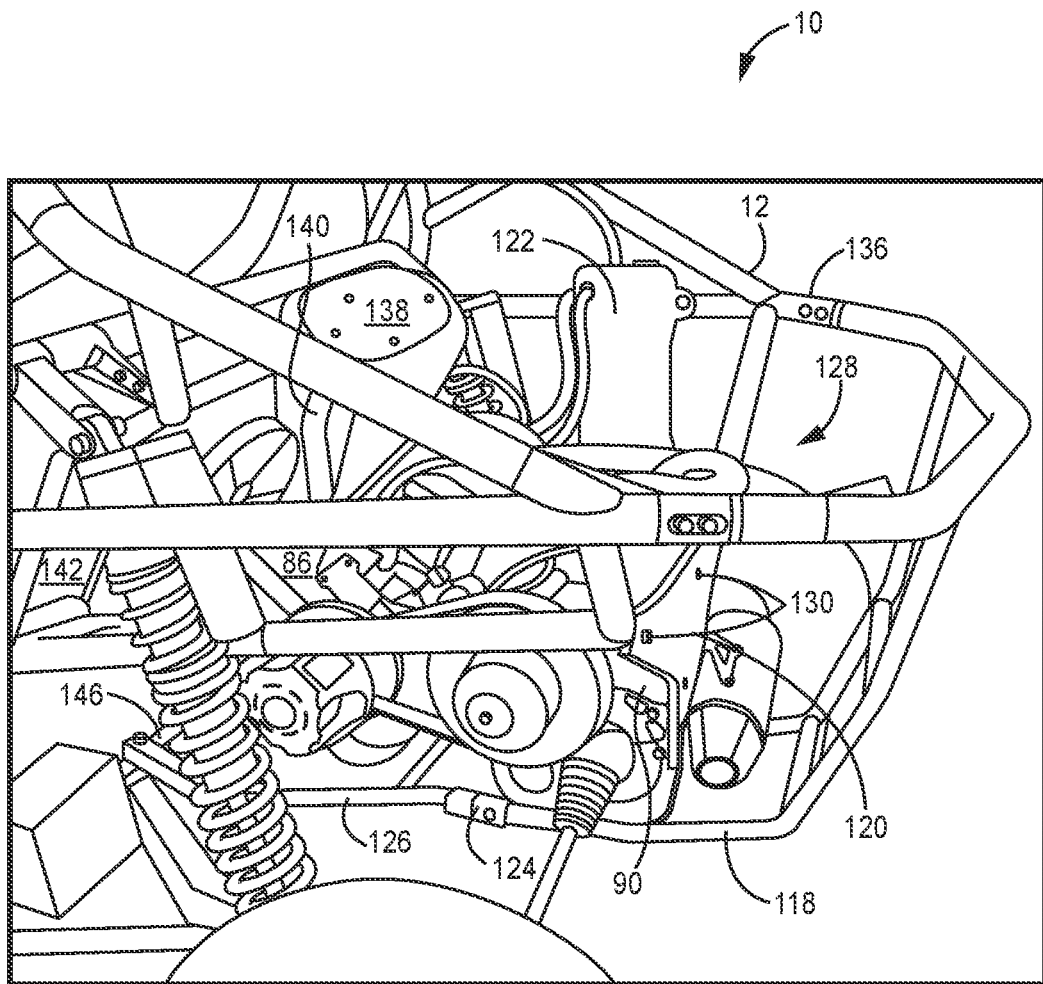
FIG. 21 is a perspective view of a portion of an off-road vehicle.

With regard to FIG. 21, an example of a vehicle is shown. As illustrated, the rear subframe can be removed from the frame to expose the rear bulkhead. In some examples, the top portion of the rear subframe extends upwardly to a height that is higher than the transmission (e.g., CVT). In some examples, the top portion of the rear subframe extends upwardly to a height that is higher than the top of the engine camshaft(s). In some examples, the top portion of the rear subframe extends upwardly to a height that is higher than the top of the engine. In some example, the top portion of the rear subframe is lower than the upper attachment location of the rear spring.

In some examples, the transmission is attached to the rear bulkhead. An engine cradle is attached to both the engine and the transmission. In some examples, the engine cradle attaches to both the front and rear of the engine, for example with vibration isolating mounts (e.g., elastomeric mounts for example having a rubber or rubberized material). The engine cradle is formed, at least in part, from tubular material such as steel which is bent into a u-shape to form the cradle. The engine cradle has left and right tubes that extend underneath the engine. In some examples, the engine cradle is part of an engine cradle assembly and it attaches to the transmission, for example a front of the transmission. In some examples, the rear of the transmission is attached to the frame, for example via vibration isolating mounts (e.g., elastomeric or rubberized mounts). In some examples, the rear of the transmission (e.g., transaxle) is attached to a bulkhead (e.g., FIG. 26), for example with vibration isolating mounts. In some examples, however, the rear of the transmission is attached to a portion of the main frame (e.g., FIG. 11), for example via a vibration isolating mount and a fattener (e.g., bolt and nut).

In another example, as in FIGS. 21-25, the vehicle comprises a modular frame, having a removable front frame portion. In some examples, the front frame portion can be dropped from the remainder of the frame in order to quickly remove the steering rack and front suspension as a module. Further, the front differential can also be attached to the removable front frame portion such that the front differential can be removed from the vehicle as part of the removable front frame modular assembly. Further, in some examples, the lower A-arms are rotatably attached to the removable front frame. Thus, the lower A-arms can be removed as part of the modular assembly. In order to remove the front frame portion and assembly, in some examples, one or more bolts are removed from the front of the frame and removable front frame portion; the bolts are used to couple the lower front frame assembly to the frame. Additionally, in order to remove the lower front frame portion from the frame, bolts attaching the lower front frame portion and the frame are removed from an area in front of the passenger compartment but rearwardly of the front CV shafts. Further, the upper A-arms can be attached to a portion of the frame; removal of the upper A-arms can be accomplished by removing bolts attaching the upper A-arms to the frame. In some examples, the front differential is a stressed member, meaning that substantial forces of the front suspension are transferred through the front differential.

Figure 22:
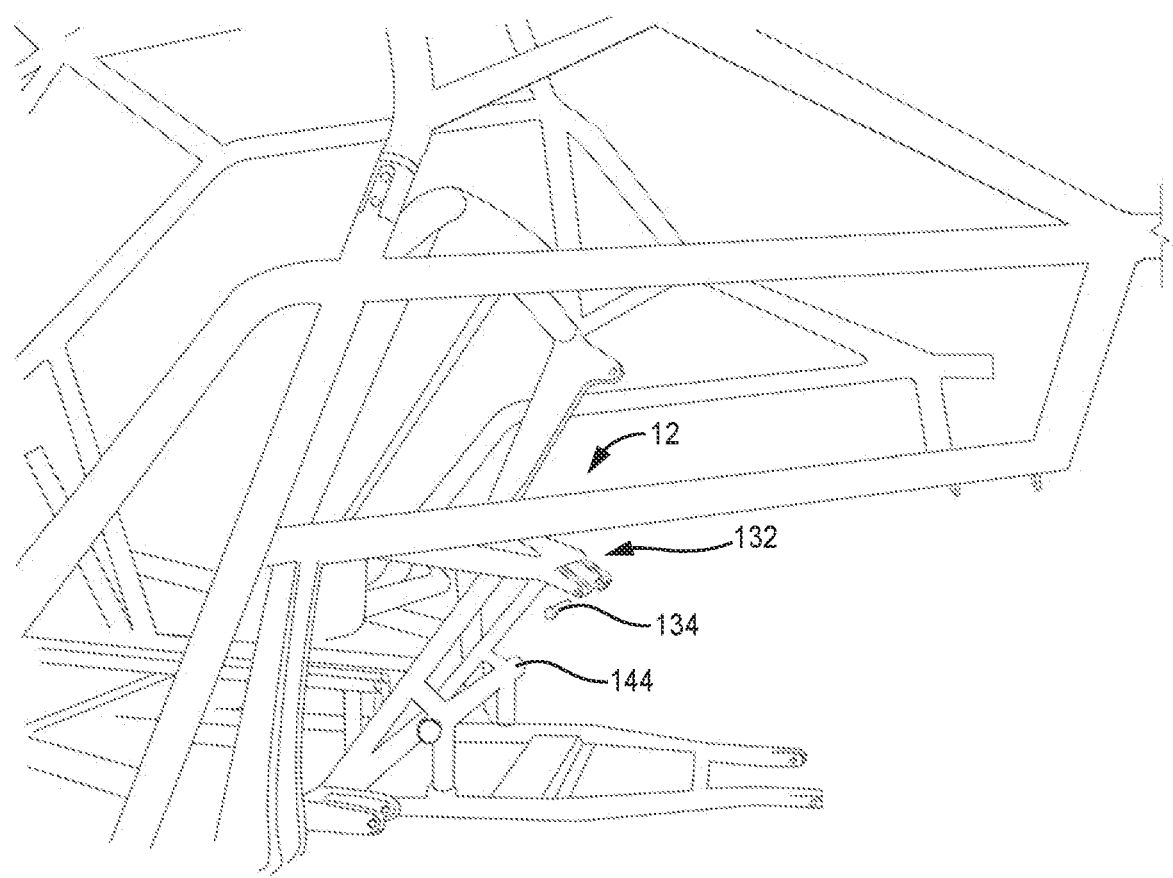
FIG. 22 is a perspective view of a portion of an off-road vehicle.

As shown in FIGS. 21 and 22, in some examples, the vehicle includes a rear subframe that is removable from the vehicle to access the rear bulkhead, engine, transmission, and area behind the passenger compartment. Upon removal of the rear subframe, the mechanic, for example, can easily access the rear bulkhead. The rear bulkhead, in turn, is coupled to the transmission. Therefore, the transmission and engine can be removed along with the bulkhead as they are coupled together via the cradle.

In some examples, the engine has a wet sump. In some examples, the engine has a dry sump. The oil tank for the dry sump can be located between the engine and transmission, for example. In some examples, the oil tank is part of the cradle assembly such that it is removed with the engine and transmission without having to disconnect any oil lines or oil fittings. In some examples, the radiator is part of the cradle assembly such that it is removed with the engine and transmission without having to disconnect any coolant lines or coolant fittings. This modularity permits a mechanic to easily work on the engine, transmission, cooling, and oiling system outside of the vehicle without having to disconnect fluid lines. In a racing application, this can save time in pit stops, for example.

Figure 23:
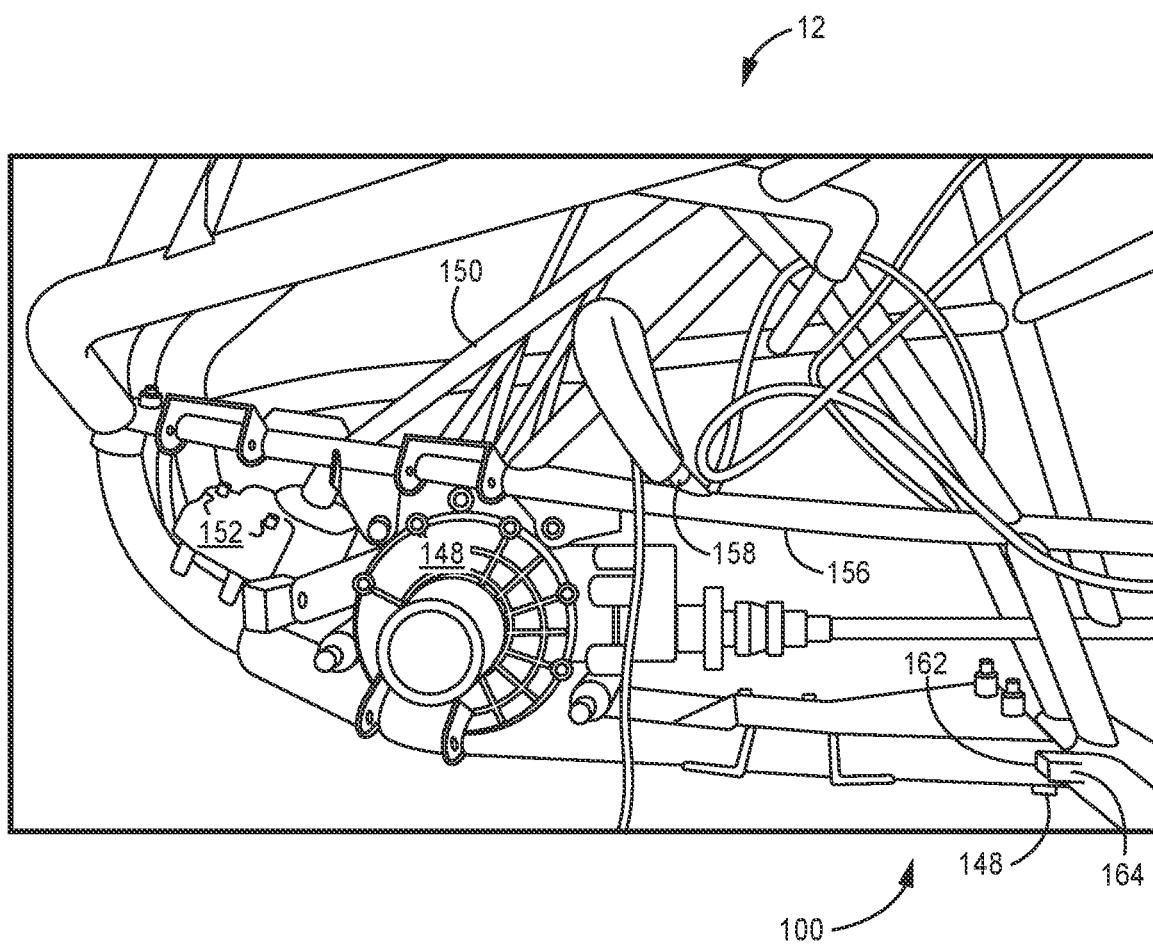
FIG. 23 is a perspective view of a portion of an off-road vehicle.

With regard to FIG. 23, in some examples, the frame includes tubular members through which coolant for the engine and radiator flows. Coolant flows in one direction through one of the coolant flow members and in the opposite direction through the other of the coolant flow members in order to create a coolant circuit. The coolant routing members can also serve a structural purpose for the frame. Such coolant routing members can be utilized where the engine is behind the passenger compartment and the radiator is in front of the passenger compartment, for example.

In some examples, the vehicle utilizes the same coil-over spring and shock combination with both the front and rear suspensions. In some examples, however, the front coil-over spring and shock combination is different than the rear spring and shock combination. For example, the front suspension may not have the same travel as the rear. In some examples, however, the spring and shock combination in the front has a greater travel than that of the rear suspension.

In some examples, the vehicle is less than 70"; in some examples, less than 68", 66", 64", 62", and in some examples, less than 60".

In some examples, the front CV shaft length is less than 30", less than 29", 28", 27", 26", 25", 24", 23", 22". In some examples, the front CV shaft is 24". In some examples, the front CV shaft can move 4.5" (e.g., the "plunge") due to the depth of the CV joint housing.

Those skilled in the art will recognize that the embodiments and examples disclosed herein are not limited to the variations or figures described. The present disclosure is to be understood as not limited by the specific embodiments described herein.

Returning to FIG. 1, in some examples, an off-road vehicle 10 comprises a frame 12. The frame 12 includes a plurality of frame members 14 which are arranged to surround the occupant or occupants of the off-road vehicle 10. In some examples, the frame members 14 have circular cross-sections, however, other cross sections are also suitable, such as rectangular, square, etc. The frame members 14 may further have a profiled cross-section to allow mating of a door frame or window against the frame member.

Figure 4:
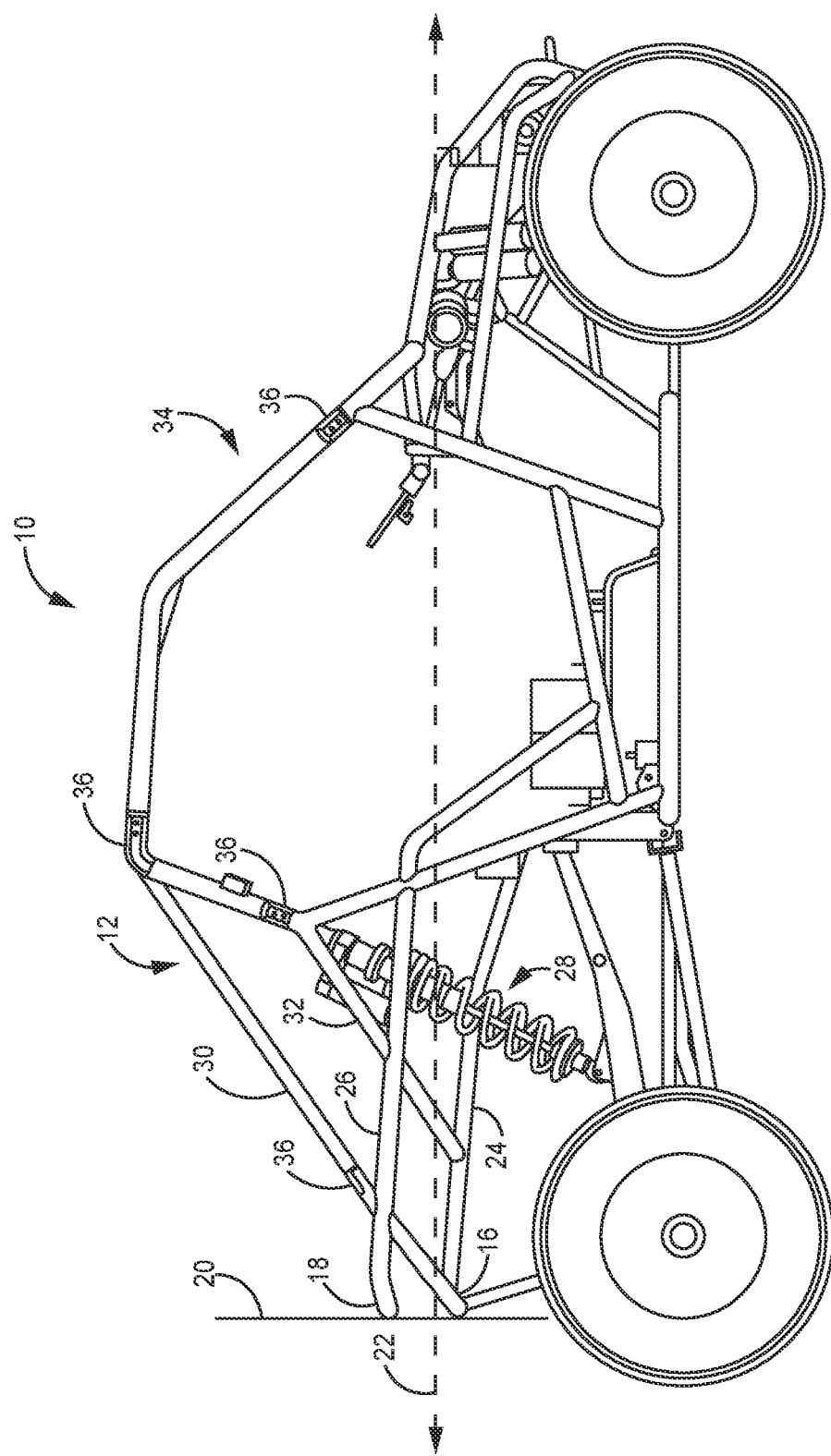
FIG. 4 is a side view of the off-road vehicle of FIG. 1.

As shown in FIGS. 2 and 4, some examples of the frame 12 have a plurality of rear frame members 16, 18, including an upper rear frame member 18 and a lower rear frame member 16. In some examples, the rear most portion of the upper and lower rear frame members 16, 18 lie on a common vertical plane 20 that is orthogonal to the longitudinal axis 22 of the off-road vehicle 10, as shown in FIG. 4. Further, in some examples, the frame 12 has a plurality of generally longitudinally extending frame members, including a lower generally longitudinally extending frame member 24 and an upper generally longitudinally extending frame member 26. In some examples, at least portions of the generally longitudinally extending frame members 24, 26 are parallel to one another when viewed from the side. When viewed from above, however, in some examples, the generally longitudinally extending frame members 24, 26 are non-parallel, as shown in FIG. 6. In some examples, a portion of the rear spring and shock assembly 28 extends between the lower generally longitudinally extending frame member 24 and upper generally longitudinally extending frame member 26.

As further shown in FIG. 4, in some examples, the frame 12 further includes a rear upper angled frame member 30 and rear lower angled frame member 32. When viewed form the side, as in FIG. 4, in some examples, the rear upper angled frame member 30 and rear lower angled frame member 32 appear parallel.

In some examples, the frame 12 includes a roll-over protection structure (ROPS) 34. In some examples, the ROPS is wider at its base than at the top of the vehicle, for example as shown in FIG. 6. In some examples, the ROPS attaches to the remainder of the frame 12 at a plurality of disconnects 36, as illustrated in FIG. 4. In some examples, the disconnects 36 are formed from cast members that are welded to adjacent frame members 14. Further, as shown in FIG. 9, in some examples, the disconnects 36a matingly fit with adjacent disconnects 36b to facilitate secure attachment of the relevant frame members 14. In some examples, the disconnects 36a and 36b are attached to one another via bolts or other fasteners.

In some examples, the off-road vehicle 10 has a plurality of frame members having a wall thickness of 0.065", 0.072", 0.083", 0.095", 0.109". Other suitable wall thicknesses can also be used.

Figure 14:
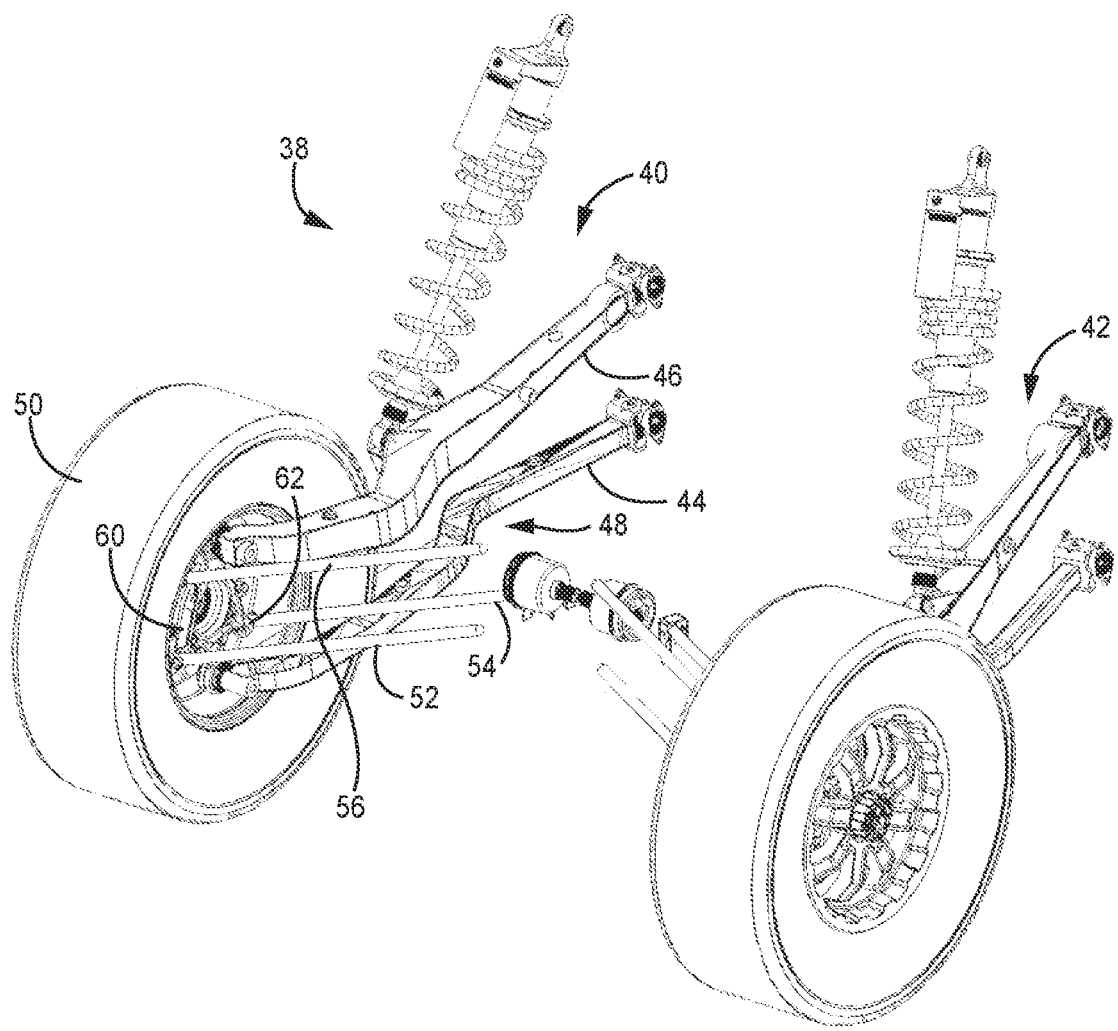
FIG. 14 is a perspective view of a rear suspension assembly of the off-road vehicle of FIG. 1.

With regard to FIG. 6, in some examples, the off-road vehicle 10 includes a rear suspension assembly 38. As shown in greater detail in FIGS. 14-17, the rear suspension assembly 38 includes a left rear suspension assembly 40 and a right rear suspension assembly 42. In at least some examples, each of the left rear suspension assembly 40 and right rear suspension assembly 42 comprises a lower rear link 44 and an upper rear link 46. In some examples, one or both of the lower and upper rear links 44, 46 include a notched or bent portion 48 to permit clearance for the ground engaging member 50, as shown in FIG. 14. In some examples, one or both of the lower and upper rear links 44, 46 are formed from sheet metal such as sheet steel. In some examples, the lower and upper rear links 44, 46 are formed from a corrugated sheet steel material which provides increased strength as compared to non-corrugated material. The lower and upper rear links 44, 46 may alternatively be referred to as trailing arms or trailing links. In some examples, one or both of the lower and upper rear links 44, 46 extend rearwardly from a portion of the frame 12 rearwardly of the operator area. In some examples, the lower and upper rear links 44, 46 are attached to a portion of the frame 12 via a universal style joint permitting the lower and upper rear links 44, 46 to move along an arc 58 (FIG. 15) governed, in-part, by the lateral links 52, 54, 56, as introduced below.

Figure 15:
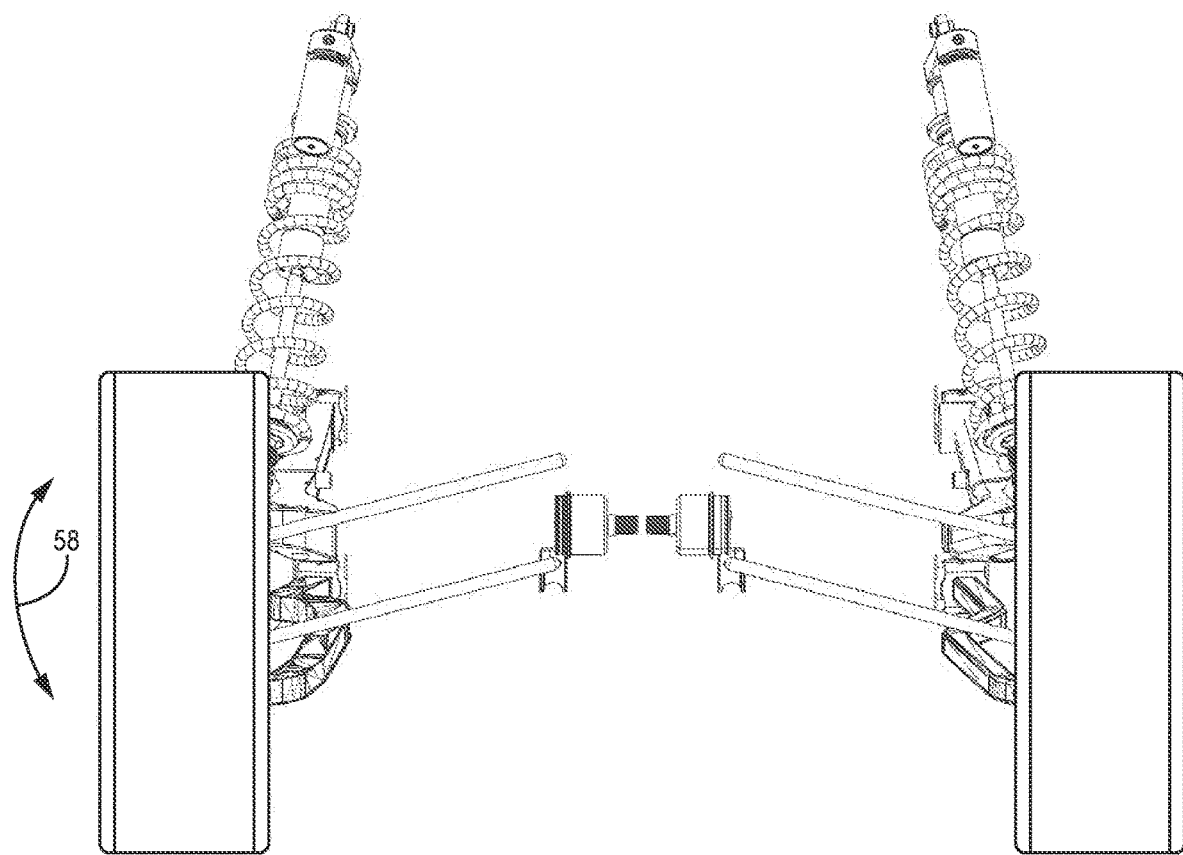
FIG. 15 is a rear view of a rear suspension assembly of the off-road vehicle of FIG. 1.

In some examples, each of the left rear suspension assembly 40 and right rear suspension assembly 42 further includes one or more lateral links 52, 54, 56, as shown by way of example in FIG. 14. In some examples, one or more of the lateral links 52, 54, 56 are attached to a wheel hub 60 via pivots 62. As illustrated in FIG. 15, in some examples, the lateral links 52, 54, 56 extend rearwardly from the frame (not shown in FIG. 15) to the wheel hub 60.

Figure 16:
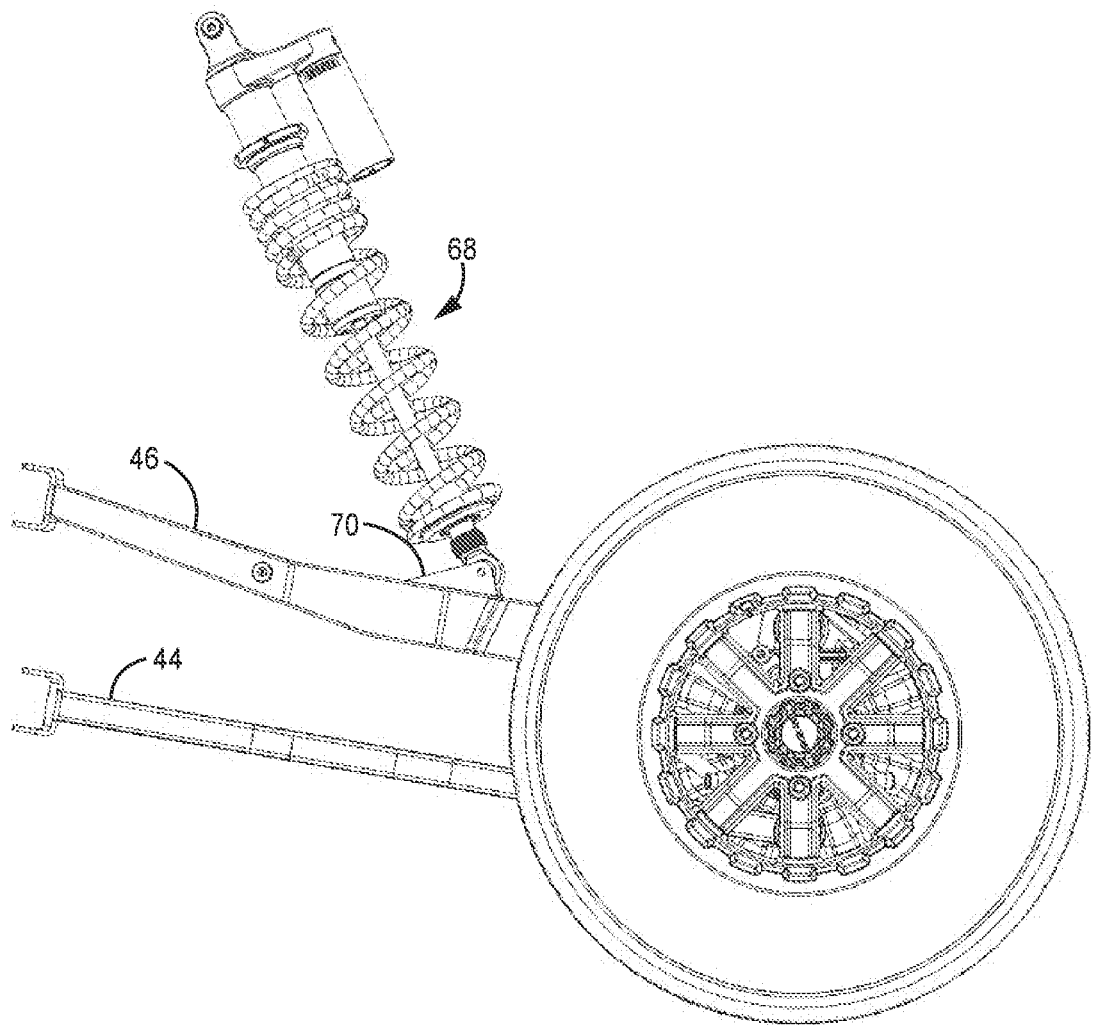
FIG. 16 is a side view of a rear suspension assembly of the off-road vehicle of FIG. 1.
Figure 17:
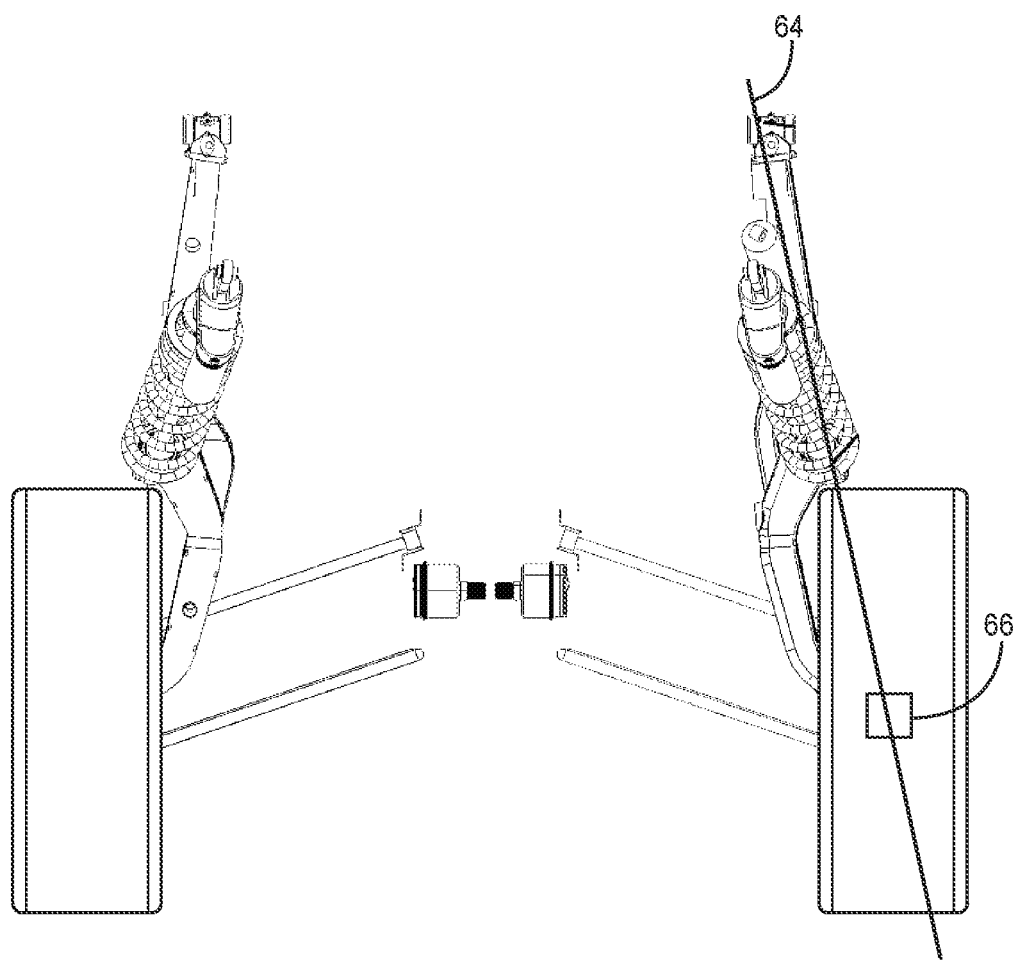
FIG. 17 is a top view of a rear suspension assembly of the off-road vehicle of FIG. 1.

As further illustrated in FIG. 17, which shows a top-down view, in some examples, the coil-over spring 68 is attached to the upper rear link 46 on a line 64 that extends between the attachment location of the upper rear link 46 to the frame (not shown in FIG. 17) and the center of the ground engaging member's contact patch 66. As shown in FIG. 16, in some examples, the coil-over 68 is attached to the upper rear link 46 via a bracket 70. In some examples, the coil-over 68 is attached to the bracket 70 in a double shear configuration, as illustrated in FIG. 14. In some examples, the coil-over 68 can include adjustments one or more of the spring and shock settings. By way of example, a stop on the spring can be adjusted; further, the shock can be adjusted to impact the damping characteristics of the shock.

Returning to FIG. 3, the off-road vehicle 10 further includes a front suspension assembly 72, which includes left and right front suspension assemblies 74, 76, respectively. In some examples, the left front suspension assembly 74 is a mirror image of the right front suspension assembly 76. In some examples, each of the left and right front suspension assemblies 74, 76 includes a lower A-arm 78 and an upper A-arm 80. Located intermediate the upper and lower A-arms 80, 78 is a half-shaft 82, which drives the front ground engaging member 50. In some examples, the lower A-arm 78 has a spring and shock (e.g., coil-over 68) pivotably attached thereto. As illustrated in FIG. 6, in some examples, the spring and shock are located rearwardly of the half-shaft 82. As further shown in FIG. 6, a steering link 84 can be located forwardly of the half-shaft 82, however, other configurations are also permissible.

With regard to FIG. 7, in some examples, the off-road vehicle 10 further comprises a prime mover 86 (e.g., engine, electric motor, hybrid motor, etc.) and a CVT 88.

Turning to FIG. 11, in some examples, the off-road vehicle 10 includes a transaxle 90 and a drive shaft 92. In some examples, at least a portion of the drive shaft 92 extends forwardly from the transaxle 90. In some examples, a portion of the drive shaft 92 extends under the prime mover 86. In some examples, the prime mover is a three-cylinder engine having a dry-sump oiling system, as shown in FIG. 21, including a remote oil tank 122.

Figure 12:
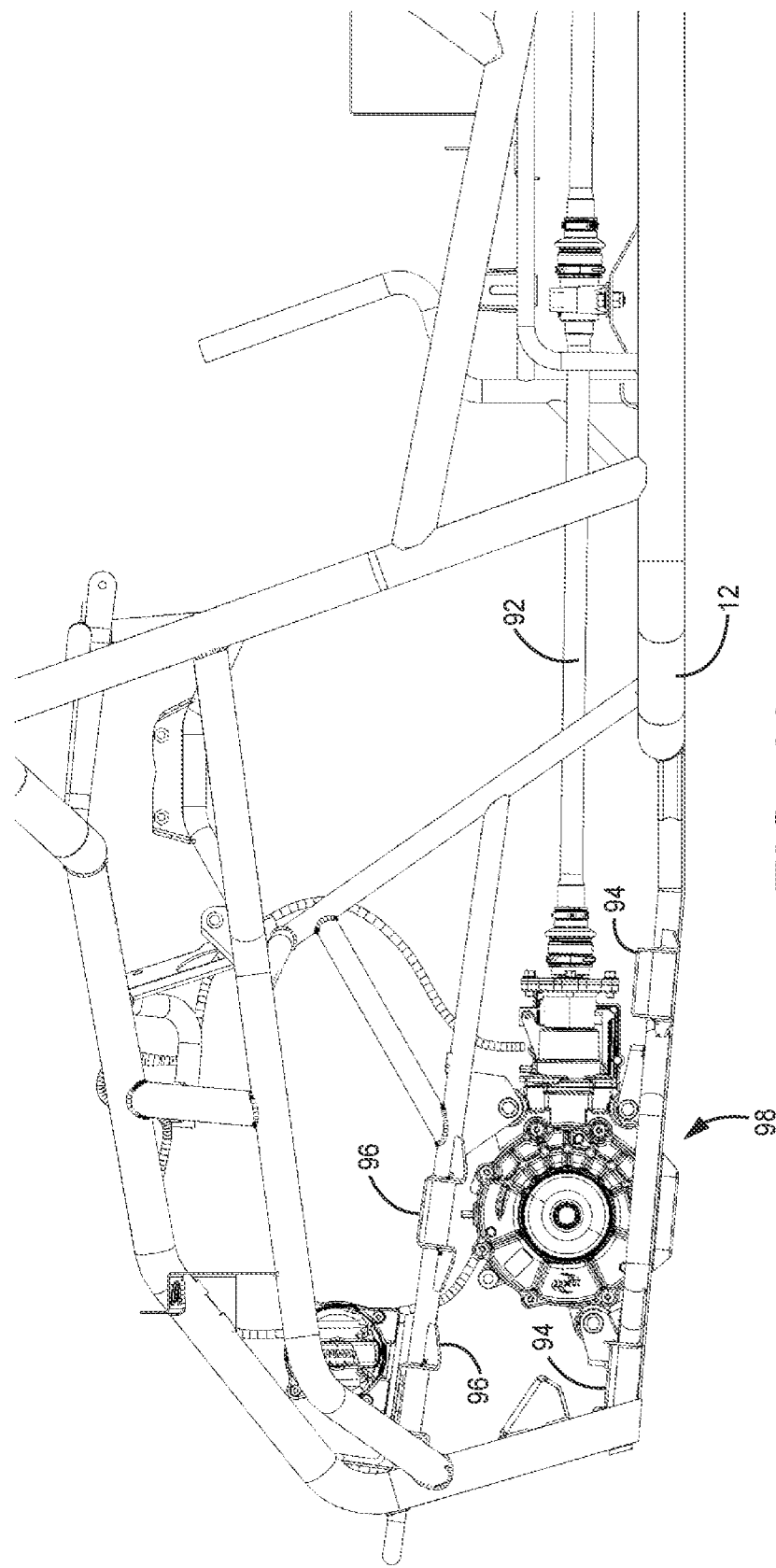
FIG. 12 is a detailed side view of a portion of the off-road vehicle of FIG. 11.

With regard to FIG. 12, in some examples, the lower A-arm 78 is pivotably attached to the frame 12 via lower attachment tabs 94. Further, the upper A-arm 80 is pivotable attached to the frame 12 via upper attachment tabs 96.

A front differential 98 drives the front ground engaging members 50 via drive shaft 92. The front differential 98 can be of any suitable variety, for example a manually locking differential, automatically locking differential, air locker, limited slip, hydraulically actuated limited slip differential, etc.

Figure 18:
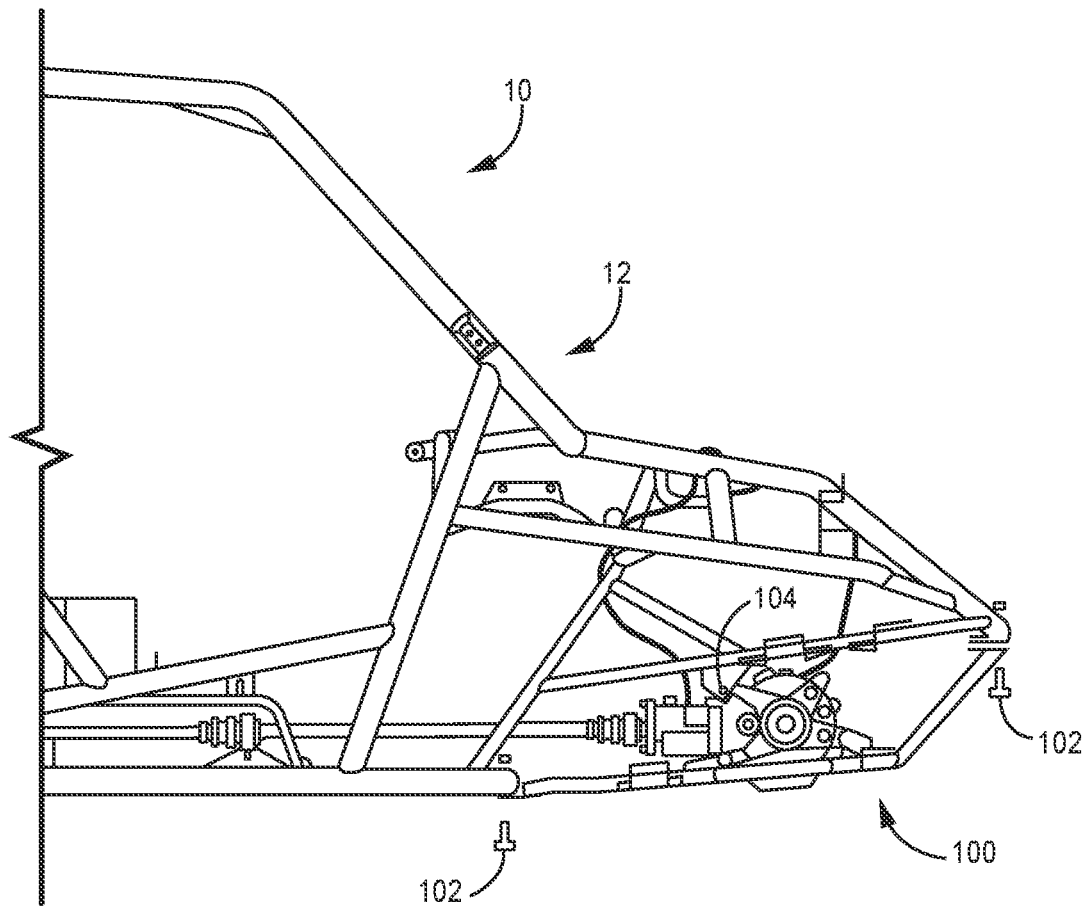
FIG. 18 is a detailed side view of a portion of an off-road vehicle.

With regard to FIG. 18, in some examples, the frame 12 has a front subframe 100. In some examples, the front differential 98 is attached to the front subframe 100 such that upon removal of subframe fasteners 102 and fasteners 104 attaching the front differential 98 to the main portion of the frame 12, the front differential 98 can be removed with the front subframe 100.

Turning to FIG. 19, in some examples, the rear suspension assembly 38 comprises a wishbone trailing arm 106. In some examples, the wishbone trailing arm 106 is pivotably attached to the frame 12. In some examples, the wishbone trailing arm 106 is pivotably attached to the frame 12 via one or more spherical bearings 108. In some examples, the wishbone trailing arm 106 is attached to the frame via a spherical bearing 108 (FIG. 28) coupled to an adjuster 110. The adjuster 110 can be adjusted upwardly or downwardly as illustrated via arrow 112 in order to adjust the camber profile of the ground engaging member (not shown in FIG. 19). In some examples, the adjuster 110 is a turnbuckle, linear actuator, or rotary actuator that can be adjusted either manually when the vehicle is stopped or dynamically, e.g., from inside the operator compartment via a switch, when the vehicle is in operation.

Figure 20:
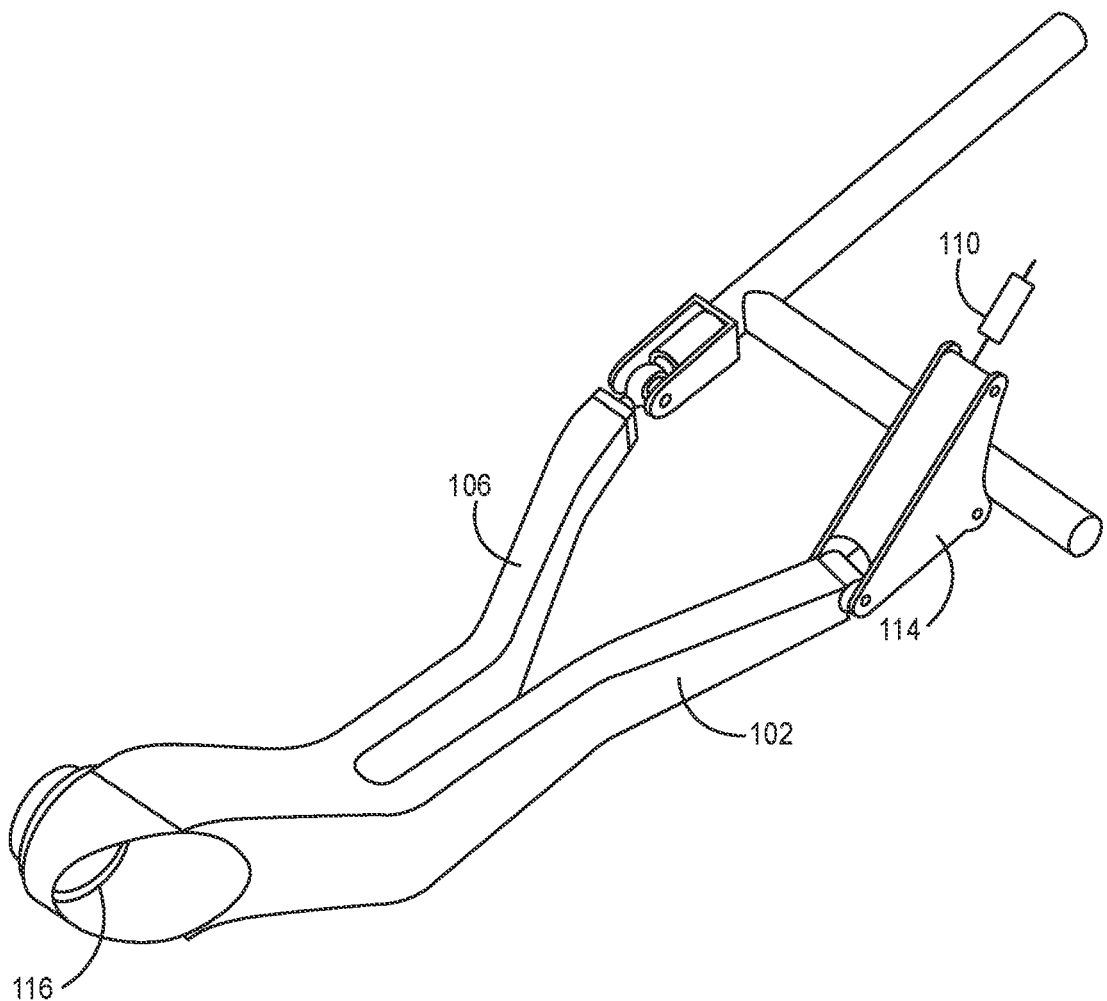
FIG. 20 is a perspective view of a portion of a rear suspension assembly.

As shown in greater detail in FIG. 20, the wishbone trailing arm 106 includes two adjacent arms along a portion of its length. As will be appreciated, the adjuster 110 is coupled, in some embodiments, to the inside arm of the wishbone trailing arm 106, for example via mount 114, which, in some examples, forms a bell crank. In some examples, the wishbone trailing arm 106 further includes a wheel bearing 116.

Turning to FIG. 21, in some examples, the frame 12 of off-road vehicle 10 has a removable rear subframe 118. In some examples, the rear subframe 118 includes a rear bulkhead 120. The rear subframe 118 can be removed from the main portion of the frame 12 at rear disconnects 136, which, in at least some examples, have a structure similar to those of disconnects 36 and, further, upon removal of fasteners 124, which attach the lower rear subframe members 126 to a portion of frame 12. Upon removal of the rear subframe 118, the rear drive assembly 128 can be removed from the frame 12 by removing fasteners 130 from the frame 12 and by uncoupling the prime mover 86 from its attachment location 132 (FIG. 22) on the frame 12. In some examples, the fasteners 130 are bolts extending through a portion of the rear bulkhead 120 to attach the rear bulkhead 120 to the frame 12. In some examples, the rear subframe 118 cam be removed from the frame 12 via eight, six, four, or even fewer fasteners (e.g., bolts); further, in some examples, the rear drive assembly 128 can be removed from the frame 12, along with rear bulkhead 120, with the removal of fasteners 130 and fastener or fasteners 134. In some examples the rear bulkhead 120 is attached to the transaxle 90, for example via a plurality of fasteners.

Figure 27:
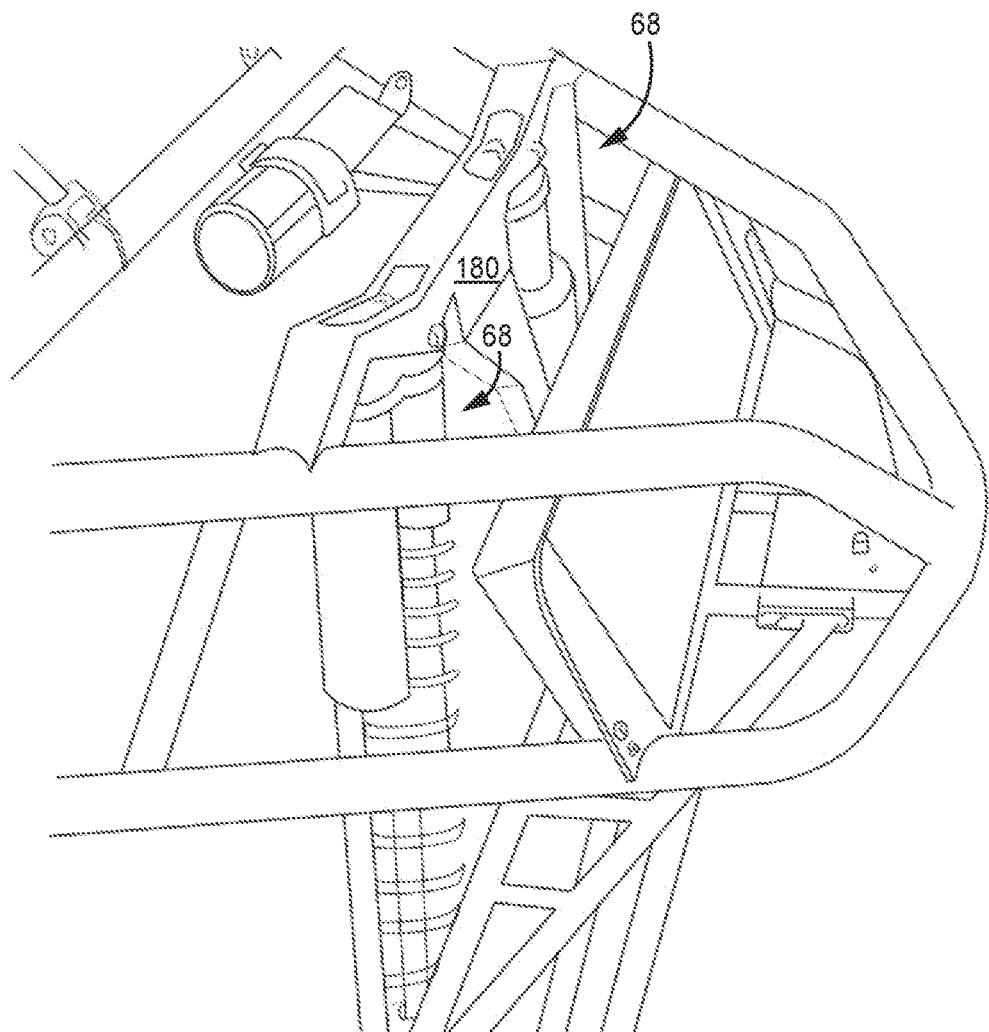
FIG. 27 is a perspective view of a portion of an off-road vehicle.

With further regard to FIG. 21, in some examples, the prime mover 86 (e.g., engine) has an air filter 138 attached thereto. In some examples, the air filter 138 is fluidly coupled to the prime mover 86 by way of intake runners 140. Further, in some examples, the off-road vehicle 10 includes a radiator 142 located rearwardly of the passenger compartment and forwardly of the prime mover 86. In some embodiments, however, as shown in FIG. 27, for example, the radiator 142 is located forwardly of the operator area.

With regard to FIG. 22, an example of the frame 12 is shown with the rear drive assembly 128 removed from the off-road vehicle 10. As illustrated, in some examples, the rear frame 12 includes a horizontal frame member 144 through which the torsion portion of an anti-roll bar 146 (FIG. 21) can be inserted. In some examples, the anti-roll bar 146 includes a torsion portion having splines onto which links can be added to attach to the rear suspension, as shown for example in FIG. 21. In some examples, however, the anti-roll bar 146 is formed from a single piece of material that is bent at the ends thereof.

Figure 24:
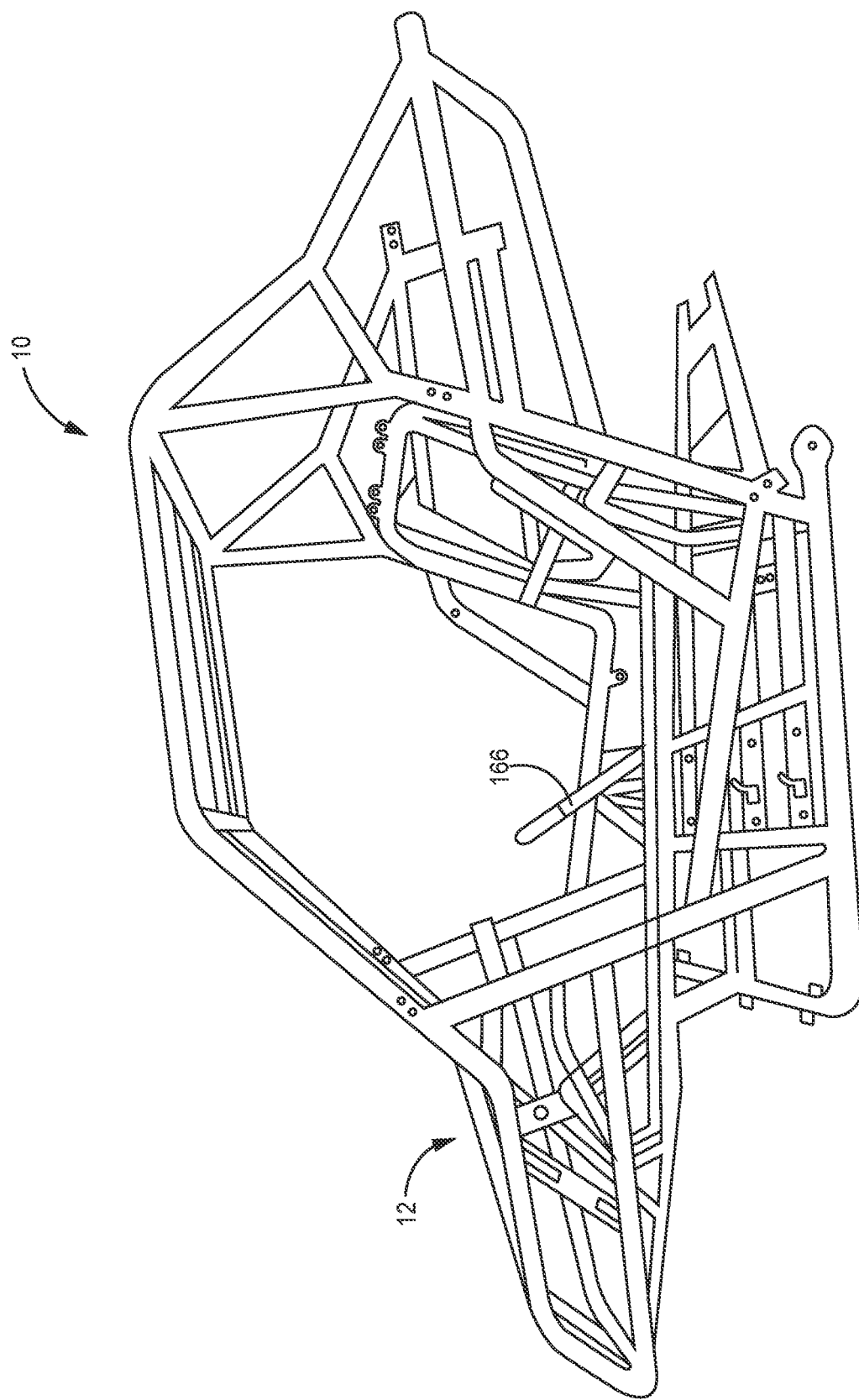
FIG. 24 is a perspective view of a portion of an off-road vehicle.

Turning to FIGS. 23 and 24, in some examples, the off-road vehicle 10 includes a frame 12 and a removable front subframe 100. In some examples, the front subframe 100 can be removed from the frame 12 by removal of fasteners 148 and 150 which, in some examples, are bolts/nuts securing the removable front subframe 100 to the frame 12. In some examples, the front differential 98 is attached to the removable front subframe 100 and also to the frame 12. Moreover, in some examples, suspension loads (e.g., transferred through the A-arms) are transferred through the differential case 148. In this way, in some examples, the differential case 148 acts as a structural member, resulting in the elimination of frame members (e.g., tubes) and, consequently, a lighter frame 12 (and overall off-road vehicle 10). In some examples. The front subframe 100 is attached to the frame 12 via a channel 162 and protrusion 164; the protrusion 164 can be inserted into the channel 162.

In some examples, the off-road vehicle 10 further includes a steering shaft 150 and a steering rack 152. In some examples, the steering rack 152 is a rack-and-pinion having a progressive steering ratio. In some examples, the off-road vehicle 10 includes electric power steering (EPS), as shown via EPS unit 154 in FIG. 1.

In some examples, for example where the radiator is located forwardly of the operator area, the frame 12 includes coolant lines 156. In some examples, the coolant lines 156 double as structural members. In some examples, the coolant lines 156 include "exit" and "return" lines and associated ports 158, 160.

As further shown in FIG. 24, the frame 12 is shown in an embodiment thereof, with the front subframe 100 and rear subframe 118 removed. In some examples, the off-road vehicle 10 includes one or more grab handles 166.

Figure 25:
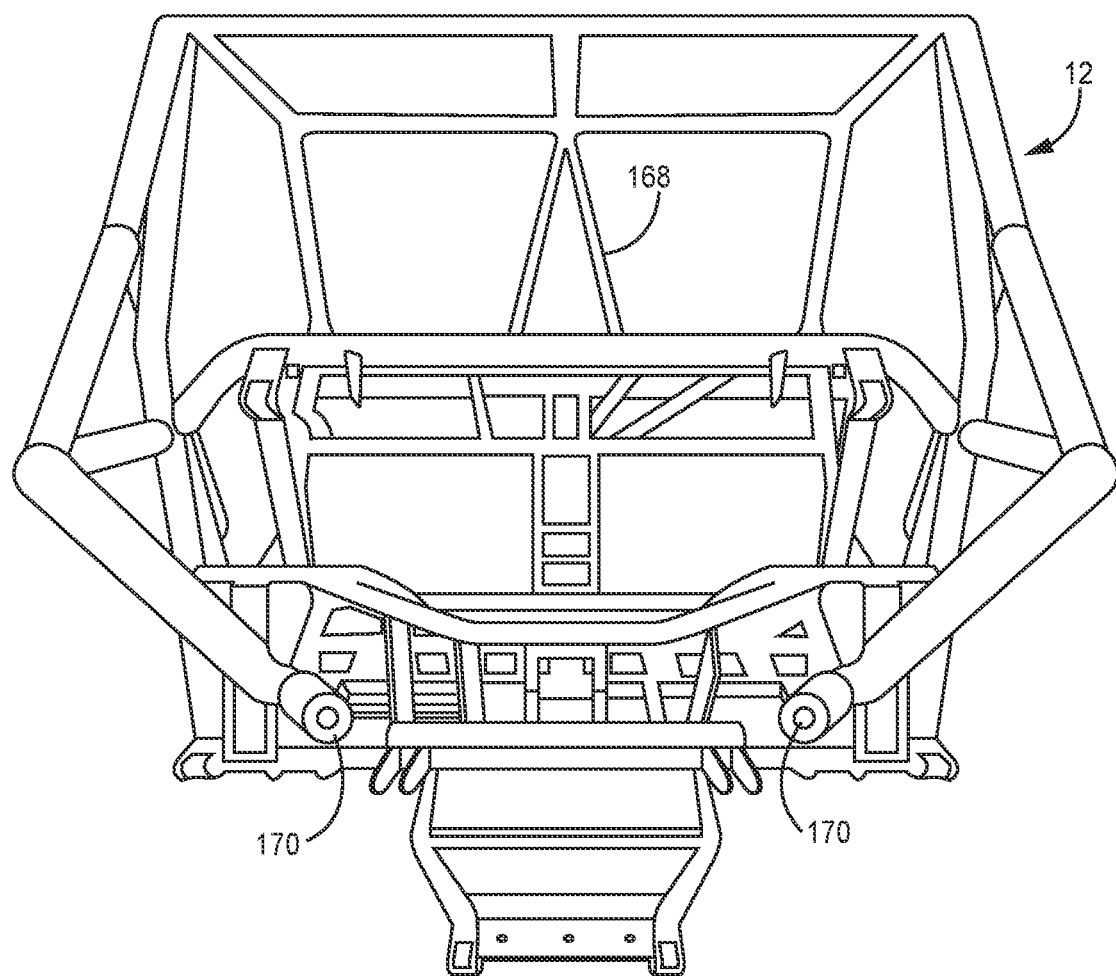
FIG. 25 is a perspective view of a portion of an off-road vehicle.

Turning to FIG. 25, in some examples, the frame 12 includes frame members forming an inverted "V" 168 angling downwardly along a forward portion of the operator area. In some examples, the frame members forming the inverted V include disconnects to permit removal (e.g., for shipping) of the ROPS structure. In some examples, the frame 12 includes tabs 170 for attachment of the rear bulkhead 120 to the frame 12.

Figure 26:
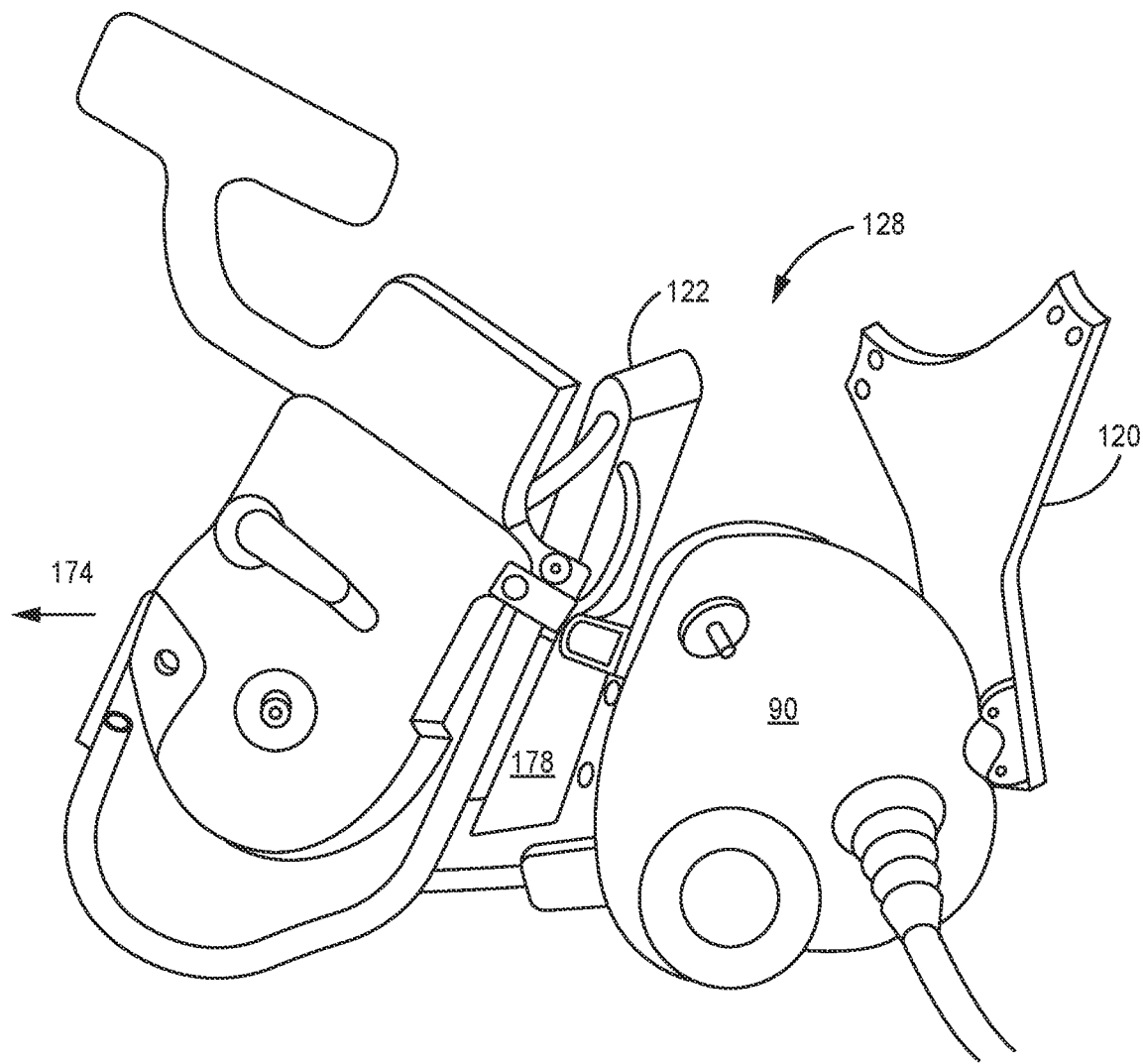
FIG. 26 is a view of a drive assembly.

With regard to FIG. 26, an embodiment of a rear drive assembly 128 is shown attached to bulkhead 120. As illustrated, in some examples, the rear drive assembly 128 can be removed from the frame 12 along with remote oil tank 122. As further shown, in some examples, a U-shaped member is coupled to a front of the engine 174 and a rear of the engine 176. In some examples, the U-shaped member is coupled to the transaxle 90, for example with a spacer member 178.

As shown now in FIG. 27, in some examples, the off-road vehicle 10 further includes front spring and shock 68 attached to a suspension bracket 180. In some examples, the suspension bracket 180 is formed from sheet metal (e.g., sheet steel) such that both left and right coil-overs are pivotably attached to a common suspension bracket 180.

With regard to FIG. 28, a detailed view of an inner arm portion 182 of the wishbone trailing arm 106 is shown in exploded view. As illustrated, in some examples, the inner arm portion has a spherical bearing 184. The spherical bearing 184 is attached to the mount 114 (FIG. 20) via spacers 186 and a fastener 188 (e.g., nut and bolt).

In some examples, the off-road vehicle 10 has two side-by-side seats. In some examples, the off-road vehicle 10 has two or more rows of side-by-side seats.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A vehicle comprising:
    a vehicle frame;
    a rear subframe, wherein the rear subframe is removable from the vehicle frame;
    a rear bulkhead, the rear bulkhead located forwardly of a rear of the rear subframe,
        wherein the rear bulkhead is connected to the vehicle frame and wherein
        removal of the rear subframe allows access to the rear bulkhead;
    an engine, the engine being transverse to a longitude of the vehicle; and
    a transmission, wherein the rear bulkhead is coupled to a rear of the transmission.

2. The vehicle of claim 1, further comprising a front differential.

3. The vehicle of claim 2, further comprising a rear differential.

4. The vehicle of claim 1, further comprising a rear cradle, the rear cradle suspending the engine above lower frame members.

5. The vehicle of claim 4, wherein the rear cradle suspends the engine above a portion of the rear subframe.

6. The vehicle of claim 1, wherein the engine, transmission, bulkhead are removable from the vehicle as a first assembly.

7. The vehicle of claim 6, further comprising an oil tank that is remote from the engine.

8. The vehicle of claim 7, wherein the oil tank is removable as part of the first assembly without disconnecting oil lines.

9. The vehicle of claim 8, further comprising a radiator, wherein the radiator is removable as part of the first assembly without disconnecting coolant lines.

10. The vehicle of claim 1, further comprising a wishbone trailing arm suspension attached to the frame at two locations.

11. The vehicle of claim 10, wherein the wishbone trailing arm suspension is coupled to the frame via an adjuster, the adjuster configured to dynamically adjust camber angle during operation of the vehicle.

12. The vehicle of claim 11, wherein the adjuster comprises an actuator.

13. A vehicle comprising:
    a vehicle frame;
    a rear subframe;
    a rear bulkhead, the rear bulkhead forwardly of a rear of the rear subframe;
    a rear engine cradle connected to the vehicle frame and the rear subframe; and
    an engine, the engine being transverse to a longitude of the vehicle and coupled to the rear engine cradle, wherein the rear engine cradle suspends the engine above a portion of the rear subframe, wherein the rear engine cradle is U-shaped and attaches to both a front and rear of the engine.

14. The vehicle of claim 13, further including a front subframe, wherein the front subframe and the rear subframe are removable from the vehicle frame.

15. The vehicle of claim 13, further including a transmission, wherein the rear cradle is further attached to a front of the transmission.

16. The vehicle of claim 15, wherein the rear bulkhead is attached to a rear of the transmission.

17. The vehicle of claim 13, wherein the engine is attached to the rear cradle with vibration isolating mounts.

\* \* \* \* \*